United States Patent
Araki

(10) Patent No.: US 12,116,235 B2
(45) Date of Patent: Oct. 15, 2024

(54) SHEET PROPERTY MEASUREMENT DEVICE AND IMAGE FORMING APPARATUS INCLUDING SHEET PROPERTY MEASUREMENT DEVICE

(71) Applicant: CANON KABUSHIKI KAISHA, Tokyo (JP)

(72) Inventor: Ryuichi Araki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/121,811

(22) Filed: Mar. 15, 2023

(65) Prior Publication Data
US 2023/0294940 A1 Sep. 21, 2023

(30) Foreign Application Priority Data
Mar. 16, 2022 (JP) ................ 2022-041720

(51) Int. Cl.
*G03G 15/00* (2006.01)
*B65H 7/02* (2006.01)

(52) U.S. Cl.
CPC ........... *B65H 7/02* (2013.01); *G03G 15/5016* (2013.01); *G03G 15/5029* (2013.01); *B65H 2511/13* (2013.01); *B65H 2511/21* (2013.01); *B65H 2551/26* (2013.01)

(58) Field of Classification Search
CPC ........................................................ B65H 7/02
USPC ............................................................ 399/45
See application file for complete search history.

(56) References Cited

U.S. PATENT DOCUMENTS

2020/0122942 A1* 4/2020 Izumiya ............ G03G 15/5029

FOREIGN PATENT DOCUMENTS

JP 2016-109425 A 6/2016
JP 2020024349 A * 2/2020 ......... G03G 15/2017

* cited by examiner

*Primary Examiner* — Quana Grainger
(74) *Attorney, Agent, or Firm* — Venable LLP

(57) ABSTRACT

A sheet property measurement device includes a passage configured to allow a sheet to be manually inserted thereinto; a reading sensor configured to read a surface of the sheet inserted into the passage; a detection unit having a displacement member configured to be brought into contact with the sheet downstream of a reading position of the reading sensor in an insertion direction in which the sheet is inserted and change in displacement amount depending on a thickness of the sheet, the detection unit being configured to detect the displacement amount of the displacement member; a sheet sensor configured to detect the sheet that has arrived at a detection position downstream of the displacement member in the insertion direction; and a controller.

12 Claims, 14 Drawing Sheets

| ADDR | DATA |
|---|---|
| 1 | 2400 |
| 2 | 2450 |
| 3 | 2370 |
| ... | ... |
| 1000 | 2550 |
| ... | ... |
| 1398 | 2600 |
| 1399 | 2590 |
| 1400 | 2550 |
| ... | ... |
| 2000 | |

SHEET SETTING

| SHEET CLASSIFICATION | TYPE | BASIS WEIGHT [gsm] | |
|---|---|---|---|
| PLAIN PAPER SHEET 2 | PLAIN PAPER SHEET | 75–90 | RECOMMENDED |
| PLAIN PAPER SHEET 1 | PLAIN PAPER SHEET | 61–74 | |
| PLAIN PAPER SHEET 3 | PLAIN PAPER SHEET | 91–105 | |
| RECYCLED PAPER SHEET 2 | RECYCLED PAPER SHEET | 75–90 | |

[TO BRAND IDENTIFICATION]  [SHEET AUTOMATIC IDENTIFICATION AGAIN]

[CANCEL]

FIG. 16

SHEET SETTING

| SHEET BRAND | TYPE | BASIS WEIGHT [gsm] | SHEET CLASSIFICATION | |
|---|---|---|---|---|
| AAAA | PLAIN PAPER SHEET | 81 | PLAIN PAPER SHEET 2 | RECOMMENDED |
| XXXXXXX | PLAIN PAPER SHEET | 81 | PLAIN PAPER SHEET 2 | |
| YYYYYYY | PLAIN PAPER SHEET | 81 | PLAIN PAPER SHEET 2 | |
| BBBB | | 70 | PLAIN PAPER SHEET 1 | |
| ZZZZZZZ | PLAIN PAPER SHEET | 90 | PLAIN PAPER SHEET 2 | |

[TO BRAND IDENTIFICATION]  [SHEET AUTOMATIC IDENTIFICATION AGAIN]

[CANCEL]

FIG. 17

| SHEET BRAND | TYPE | BASIS WEIGHT [gsm] | ALLOW SHEET PASSAGE OR NOT | LIMITATION OF FIBER ORIENTATION | SHEET-FEEDABLE PORT | FIXING SPEED [mm/s] | ... |
|---|---|---|---|---|---|---|---|
| THIN PAPER SHEET A | THIN PAPER SHEET | 58 | NOT ALLOWED | — | — | — | ... |
| THIN PAPER SHEET B | THIN PAPER SHEET | 60 | ALLOWED | NO LIMITATION | ALL STAGES | 300 | ... |
| HIGH-QUALITY PAPER SHEET A | PLAIN PAPER SHEET | 64 | ALLOWED | NO LIMITATION | ALL STAGES | 300 | ... |
| HIGH-QUALITY PAPER SHEET B | PLAIN PAPER SHEET | 81 | ALLOWED | NO LIMITATION | ALL STAGES | 300 | ... |
| HIGH-QUALITY PAPER SHEET C | PLAIN PAPER SHEET | 157 | ALLOWED | NO LIMITATION | ALL STAGES | 300 | ... |
| THICK PAPER SHEET A | THICK PAPER SHEET | 250 | ALLOWED | NO LIMITATION | ALL STAGES | 150 | ... |
| THICK PAPER SHEET B | THICK PAPER SHEET | 270 | ALLOWED | NO LIMITATION | ONLY MANUAL FEEDING | 150 | ... |
| THICK PAPER SHEET C | THICK PAPER SHEET | 300 | ALLOWED | LIMITED TO LATERAL | ONLY MANUAL FEEDING | 150 | ... |
| THICK PAPER SHEET D | THICK PAPER SHEET | 350 | NOT ALLOWED | — | — | — | ... |
| COATED PAPER SHEET A | COATED PAPER SHEET | 104 | ALLOWED | NO LIMITATION | ONLY MANUAL FEEDING | 150 | ... |
| COATED PAPER SHEET B | COATED PAPER SHEET | 128 | ALLOWED | NO LIMITATION | ONLY MANUAL FEEDING | 150 | ... |
| SYNTHETIC PAPER SHEET A | SYNTHETIC PAPER SHEET | 128 | NOT ALLOWED | — | — | — | ... |
| ... | ... | ... | ... | ... | ... | ... | ... |

FIG. 18

| SHEET BRAND NAME | BASIS WEIGHT [gsm] | ADJACENT PIXEL DIFFERENCE INTEGRATED VALUE | BRIGHTNESS | SHEET THICKNESS [μm] | SHEET CLASSIFICATION |
|---|---|---|---|---|---|
| AAAAA | 52 | 2600 | 43000 | 67 | THIN PAPER SHEET |
| ... | ... | ... | ... | ... | ... |
| BBBBB | 68 | 3000 | 50000 | 92 | PLAIN PAPER SHEET 1 |
| ... | ... | ... | ... | ... | ... |
| CCCCC | 81.4 | 2000 | 50000 | 97 | PLAIN PAPER SHEET 2 |
| ... | ... | ... | ... | ... | ... |
| DDDDD | 128 | 1500 | 46000 | 140 | COATED PAPER SHEET 1 |
| EEEEE | 209 | 10000 | 60000 | 210 | COATED PAPER SHEET 2 |
| ... | ... | ... | ... | ... | ... |

FIG. 19

SHEET PROPERTY MEASUREMENT DEVICE AND IMAGE FORMING APPARATUS INCLUDING SHEET PROPERTY MEASUREMENT DEVICE

BACKGROUND OF THE INVENTION

Field of the Invention

The present disclosure relates to a sheet property measurement device capable of identifying the type of sheet and an image forming apparatus including such a sheet property measurement device.

Description of the Related Art

For copying machines, printers, facsimile machines, multifunction peripherals, and other such image forming apparatus, types of sheets that can be used for image formation have been increasing. The image forming apparatus have been required to support various types of sheets such as paper sheets having various thicknesses and rigidity and synthetic paper sheets using resin as a raw material instead of pulp.

In general, an electrophotographic image forming apparatus forms an image on a sheet being conveyed on a conveyance path by steps of charging, exposing with light, developing, transferring, and fixing. Optimum image forming conditions in the steps differ depending on physical properties (for example, stiffness, basis weight, and surface property) of a sheet to be used. Thus, the type of a sheet to be used is registered in advance in the image forming apparatus, and the image forming apparatus is controlled with image forming conditions corresponding to the type of the sheet. The type of the sheet to be used is set by a user operation. When the user fails to correctly set the type of the sheet, an image is not formed based on appropriate image forming conditions. In this case, there is a fear in that quality of an image formed on the sheet may be poor.

The image forming apparatus as disclosed in Japanese Patent Application Laid-open No. 2016-109425 includes a photosensor for automatically identifying the type of sheet. The image forming apparatus selects a plurality of candidates for a sheet to be used from among the types of sheets registered in advance based on a detection result given by the photosensor. The user can accurately set the type of the sheet to be used for printing by selecting a sheet from among the plurality of selected candidates.

In the print-on-demand (POD) field, the image forming apparatus support high-mix low-volume production, and perform image formation while frequently changing sheets to be used. In addition, there are a wide variety of types of sheets that can be used by the image forming apparatus. In order to support settings of such a wide variety of sheets and frequent changes, the image forming apparatus are each provided with a sheet property measurement device including a photosensor for identifying the type of sheet. It is preferred that the sheet property measurement device be capable of identifying a large number of types of sheets and have high detection accuracy.

In order to improve the detection accuracy, it is effective to use a photosensor that uses a line sensor capable of widening a range of reading a sheet. The line sensor performs "reading during conveyance" in which a sheet to be identified is read while being conveyed. The sheet is inserted into the sheet property measurement device manually by a user. The sheet is conveyed at different speeds at a start of insertion, immediately before the sheet abuts against an innermost part, and after the sheet abuts against the innermost part. Thus, the line sensor causes variations in reading results (pieces of read data) of sheets at those positions. When the type of sheet is identified through use of the pieces of read data that vary in this manner, there is a problem in that the identification accuracy may be poor.

SUMMARY OF THE INVENTION

A sheet property measurement device according to one aspect of the present disclosure includes: a passage configured to allow a sheet to be manually inserted thereinto; a reading sensor configured to read a surface of the sheet inserted into the passage; a detection unit having a displacement member configured to be brought into contact with the sheet on downstream of a reading position of the reading sensor in an insertion direction in which the sheet is inserted and change in displacement amount depending on a thickness of the sheet, the detection unit being configured to detect the displacement amount of the displacement member; a sheet sensor configured to detect the sheet that has arrived at a detection position on downstream of the displacement member in the insertion direction; and a controller configured to: control the reading sensor to read the surface of the sheet a plurality of times during a period in which the sheet is being inserted; and determine a property of the surface of the sheet based on reading results excluding reading results obtained during a predetermined period from among reading results obtained by the reading sensor the plurality of times, the predetermined period being a period that precedes a timing at which the sheet is detected by the sheet sensor.

An image forming apparatus for forming an image on a sheet based on image forming conditions according to another aspect of the present disclosure includes: a passage configured to allow a sheet to be manually inserted thereinto; a reading sensor configured to read a surface of the sheet inserted into the passage; a detection unit having a displacement member configured to be brought into contact with the sheet on downstream of a reading position of the reading sensor in an insertion direction in which the sheet is inserted and change in displacement amount depending on a thickness of the sheet, the detection unit being configured to detect the displacement amount of the displacement member; a sheet sensor configured to detect the sheet that has arrived at a detection position on downstream of the displacement member in the insertion direction; a display; and a controller configured to: control the reading sensor to read the surface of the sheet a plurality of times during a period in which the sheet is being inserted; control the display to display a plurality of candidates for a type of the sheet based on reading results excluding reading results obtained during a predetermined period from among reading results obtained by the reading sensor the plurality of times, the predetermined period being a period that precedes a timing at which the sheet is detected by the sheet sensor; and control the image forming conditions based on information relating to the type of the sheet selected from among the plurality of candidates displayed on the display.

A sheet property measurement device according to yet another aspect of the present disclosure includes: a passage configured to allow a sheet to be manually inserted thereinto; a reading sensor provided to the passage and configured to read a surface of the sheet; a sheet sensor configured to detect the sheet that has arrived at a detection position on upstream of a reading position of the reading sensor in an insertion direction in which the sheet is inserted; and a controller configured to: control the reading sensor to read the surface of the sheet a plurality of times during a period in which the sheet is being drawn out in a direction opposite to the insertion direction in which the sheet is inserted; and measure a property of the surface of the sheet based on reading results excluding reading results obtained during a predetermined period from among reading results obtained by the reading sensor the plurality of times, the predetermined period being a period that precedes a timing at which the sheet is detected by the sheet sensor.

An image forming apparatus for forming an image on a sheet based on image forming conditions according to yet another aspect of the present disclosure incudes: a passage configured to allow a sheet to be manually inserted thereinto; a reading sensor configured to read a surface of the sheet inserted into the passage; a sheet sensor configured to detect the sheet that has arrived at a detection position on upstream of a reading position of the reading sensor in an insertion direction in which the sheet is inserted; a display; and a controller configured to: control the reading sensor to read the surface of the sheet a plurality of times during a period in which the sheet is being drawn out in a direction opposite to the insertion direction in which the sheet is inserted; control the display to display a plurality of candidates for a type of the sheet based on reading results excluding reading results obtained during a predetermined period from among reading results obtained by the reading sensor the plurality of times, the predetermined period being a period that precedes a timing at which the sheet is detected by the sheet sensor; and control the image forming conditions based on information relating to the type of the sheet selected from among the plurality of candidates displayed on the display.

Further features of the present invention will become apparent from the following description of exemplary embodiments (with reference to the attached drawings).

BRIEF DESCRIPTION OF THE DRAWINGS

FIG. 16 is an illustrative view of sheet selection screens given after identification of a sheet type.

FIG. 17 is an illustrative view of the sheet selection screens given after identification of a sheet type.

FIG. 18 is an illustrative table of a sheet type database.

FIG. 19 is an illustrative table of a sheet type database.

DESCRIPTION OF THE EMBODIMENTS

A preferred embodiment of the present disclosure is illustratively described in detail below with reference to the drawings.

<Image Forming Apparatus>

Figure 1:
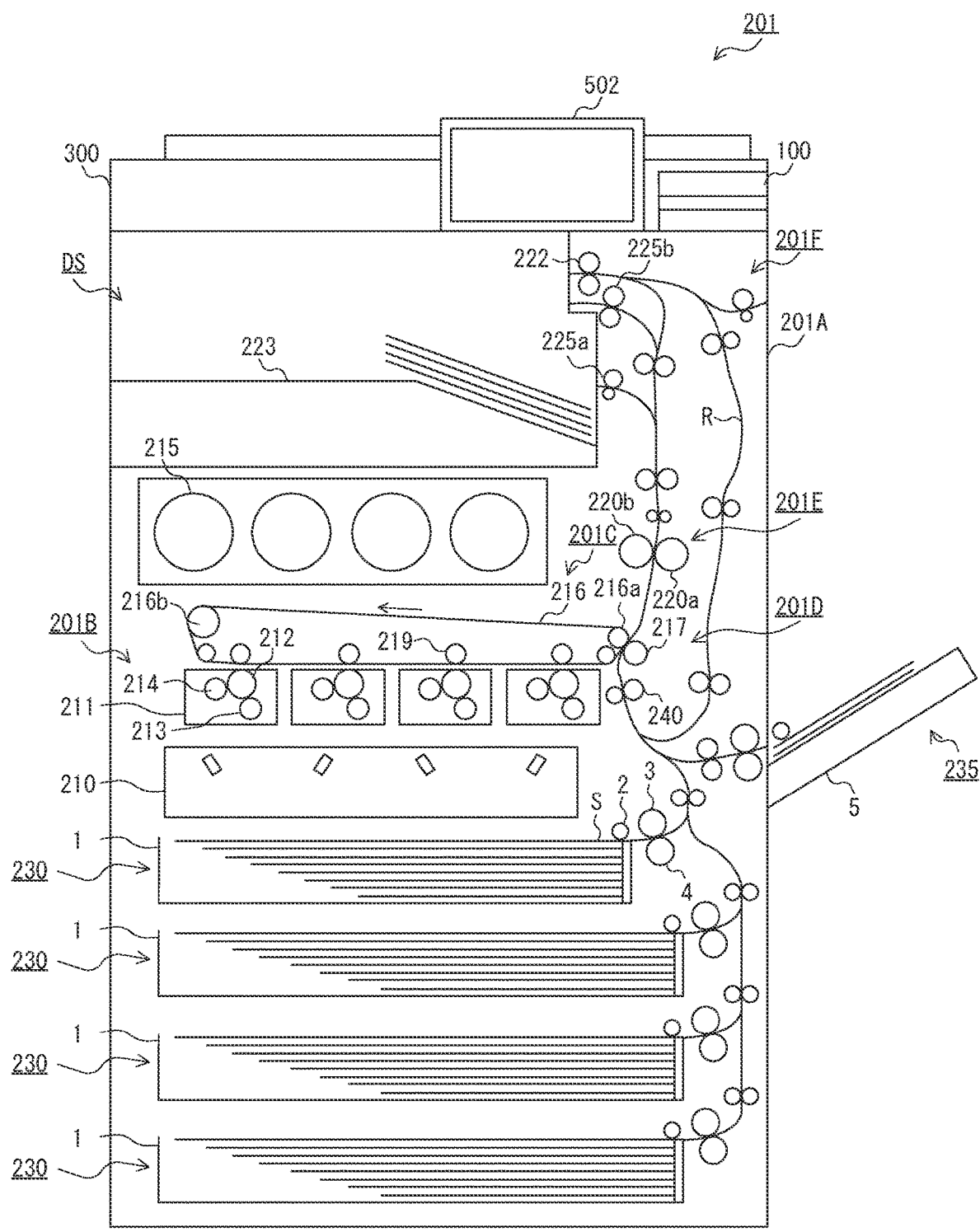
FIG. 1 is a configuration view of an image forming apparatus.

FIG. 1 is a configuration view of an image forming apparatus according to this embodiment. An image forming apparatus 201 according to this embodiment is, for example, a laser beam printer of a tandem intermediate-transfer type using an electrophotographic process. The image forming apparatus 201 forms a full color image or a monochrome image on a sheet S being a recording medium and outputs the sheet S based on image data acquired from an external device, for example, a personal computer via a network or based on image data acquired from an image reading device 300.

The image forming apparatus 201 has, inside a main body 201A, components for forming an image, and includes, on the top of the main body 201A, an image reading device 300, an operation unit 502, and a sheet property measurement device 100. A delivery space DS for receiving the sheet S to be delivered thereinto after image formation is defined between the main body 201A of the image forming apparatus 201 and the image reading device 300.

The image reading device 300 is a scanner which reads an image from an original and generates image data. The image reading device 300 is used, for example, at the time of processing of copying an original. The operation unit 502 is a user interface including an input interface and an output interface. Examples of the input interface include various key buttons and a touch panel. Examples of the output interface include a display and a speaker. A user can input various instructions to the image forming apparatus 201 via the operation unit 502. The sheet property measurement device 100 is a device for identifying the type of the sheet S that is used by the image forming apparatus 201 for image formation (printing). Details of the sheet property measurement device 100 are described later.

The image forming apparatus 201 includes, in the main body 201A, an image forming unit 201B, an intermediate transfer unit 201C, a secondary transfer unit 201D, a fixing device 201E, and cassette sheet-feeding units 230.

The cassette sheet-feeding units 230 each feed sheets S from a corresponding one of sheet-feeding cassettes 1 accommodating the sheets S. The cassette sheet-feeding unit 230 includes a pickup roller 2 and a separation unit. The separation unit includes a feed roller 3 and a retard roller 4 for separating sheets S sent out from the pickup roller 2. The sheets S are fed one by one from the sheet-feeding cassette 1 by the pickup roller 2 and the separation unit. In this embodiment, description is made of a configuration in which a plurality of (in this example, four) cassette sheet-feeding units 230 are provided. However, any number of cassette sheet-feeding units 230 may be provided. The sheet S fed from the cassette sheet-feeding unit 230 is conveyed to a registration roller pair 240 along a conveyance path.

The sheet S can be fed from a unit other than the cassette sheet-feeding unit 230, that is, from a manual sheet-feeding unit 235. The manual sheet-feeding unit 235 includes a manual feeding tray 5 for receiving sheets placed by a user. Similar to the cassette sheet-feeding unit 230, the manual sheet-feeding unit 235 includes a pickup roller and a separation unit, and sheets S are fed one by one from the manual feeding tray 5. The sheet S fed from the manual sheet-feeding unit 235 is also conveyed to the registration roller pair 240 along a conveyance path.

The image forming unit 201B is of a four-drum full-color type, and includes a laser scanner 210 and four process cartridges 211. The four process cartridges 211 form toner images of four colors, specifically, yellow (Y), magenta (M), cyan (C), and black (K). Each process cartridge 211 includes a photosensitive drum 212, a charging device 213, and a developing device 214. Toner cartridges 215 are arranged above the process cartridges 211. The toner cartridges 215 replenish the respective developing devices 214 with toner.

The intermediate transfer unit 201C includes an intermediate transfer belt 216 wound around a drive roller 216a and a tension roller 216b. On an inner side of the intermediate transfer belt 216, there are provided four primary transfer rollers 219 which are in abutment against the intermediate transfer belt 216 at positions opposing the photosensitive drums 212. The intermediate transfer belt 216 is rotated in the arrow direction by the drive roller 216a driven by a drive unit (not shown).

The secondary transfer unit 201D includes a secondary transfer roller 217 provided so as to sandwich the intermediate transfer belt 216 at a position opposing the drive roller 216a. The fixing device 201E is provided on a downstream side of the secondary transfer roller 217 in a conveyance direction of the sheet S, and includes a pressure roller 220a and a heating roller 220b. On a downstream side of the fixing device 201E in the conveyance direction of the sheet S, there are arranged a first delivery roller pair 225a, a second delivery roller pair 225b, and a duplex-printing reversing unit 201F. The duplex-printing reversing unit 201F includes a reversing roller pair 222 and a re-conveyance passage R. The reversing roller pair 222 is rotatable in forward and reverse directions. The re-conveyance passage R allows the sheet S having an image formed on one side thereof to be conveyed to the image forming unit 201B.

The image forming apparatus 201 having the configuration as described above operates as follows. The image forming apparatus 201 acquires image data from the image reading device 300 or from an external device and forms an image corresponding to the image data on the sheet S. At this time, the image forming apparatus 201 performs the image formation based on image forming conditions given in accordance with a type of the sheet S.

The image forming unit 201B uses the charging device 213 to uniformly charge surfaces of the photosensitive drums 212 to an electric potential having a predetermined polarity. The laser scanner 210 irradiates the uniformly charged surfaces of the photosensitive drums 212 with corresponding laser beams modulated based on the image data. In this way, electrostatic latent images for corresponding colors (yellow, magenta, cyan, and black) are formed on the respective surfaces of the photosensitive drums 212.

The image forming unit 201B uses the developing devices 214 to develop the electrostatic latent images formed on the photosensitive drums 212. The electrostatic latent images are developed on the photosensitive drums 212 with toners of corresponding colors so that toner images of the corresponding colors are formed on the photosensitive drums 212. The toner images are sequentially transferred from the photosensitive drums 212 to the rotating intermediate transfer belt 216 in superimposition by the primary transfer rollers 219. In this way, a full-color toner image is formed on the intermediate transfer belt 216. The intermediate transfer belt 216 rotates to convey the toner image to the secondary transfer unit 201D.

Concurrently with such operation of forming a toner image, the sheets S are conveyed one by one by the cassette sheet-feeding unit 230 or the manual sheet-feeding unit 235 to the registration roller pair 240. The registration roller pair 240 corrects skew of the sheet S conveyed to the registration roller pair 240. After the skew is corrected, the sheet S is conveyed by the registration roller pair 240 to the secondary transfer unit 201D in synchronization with the timing at which the toner image borne on the intermediate transfer belt 216 is conveyed to the secondary transfer unit 201D. The secondary transfer unit 201D transfers the full-color toner image from the intermediate transfer belt 216 onto the sheet S with secondary transfer bias applied to the secondary transfer roller 217.

The sheet S having the toner image transferred thereto is conveyed to the fixing device 201E. The fixing device 201E sandwiches and conveys the sheet S with a roller nip portion defined by the pressure roller 220a and the heating roller 220b. The fixing device 201E heats the sheet S with the heating roller 220b at the time of sandwiching and conveying the sheet S, to thereby melt and mix the toners of respective colors on the sheet S. Further, the fixing device 201E presses the sheet S with the pressure roller 220a, to thereby fix the melted and mixed toners to the sheet S. At this time, the viscosity of the melted toner generates a sticking force to the heating roller 220b on the sheet S.

Figure 2A:
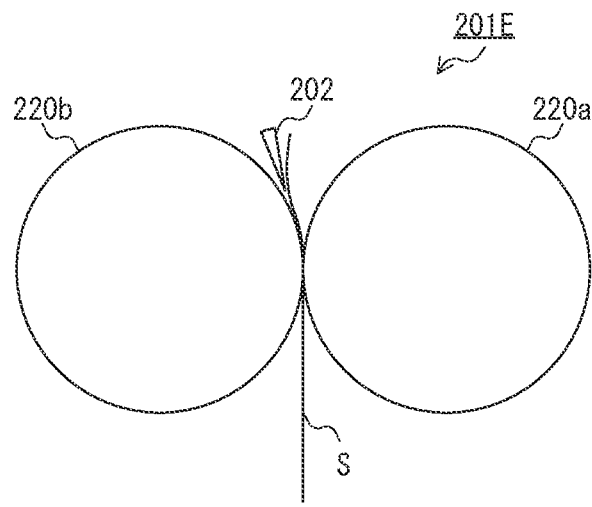
FIG. 2A and FIG. 2B are enlarged views of a fixing device.
Figure 2B:
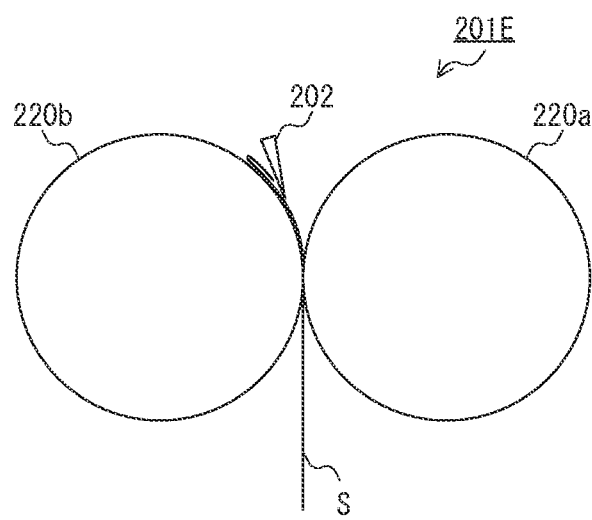

FIG. 2A and FIG. 2B are enlarged views of the fixing device 201E. When the stiffness (strength) of the sheet S is small, the sticking force to the heating roller 220b generated on the sheet S may cause the sheet S to be rolled up by the heating roller 220b being rotated (FIG. 2B). Thus, a separation plate 202 which separates the sheet S is provided on a downstream side of the heating roller 220b in the conveyance direction of the sheet S (FIG. 2A).

The image forming apparatus 201 may determine a state of the separation plate 202 in accordance with a type of the sheet S. For example, when the sheet S of a type having a small stiffness is subjected to image formation, the separation plate 202 is arranged such that a distal end of the separation plate 202 is in contact with a surface of the heating roller 220b as illustrated in FIG. 2A, to thereby separate the sheet S from the heating roller 220b. When the sheet S of a type having a large stiffness is subjected to image formation, the sheet S is not rolled up by the heating roller 220b. Thus, the separation plate 202 is arranged such that the distal end of the separation plate 202 is not in contact with the surface of the heating roller 220b. In this way, the surface of the heating roller 220b can be prevented from being worn by the separation plate 202.

The sheet S having the image fixed thereto is delivered to the delivery space DS by any one of the first delivery roller pair 225a or the second delivery roller pair 225b. The sheet S is placed on a placement portion 223 provided in a protruding manner on a bottom surface of the delivery space DS. When images are formed on both sides of the sheet S, the sheet S having an image fixed on one side thereof is conveyed by a reverse roller pair 222 to the re-conveyance passage R. The sheet S is conveyed again to the image forming unit 201B, and an image is formed on another side of the reversed sheet S.

<Controller>

Figure 3:
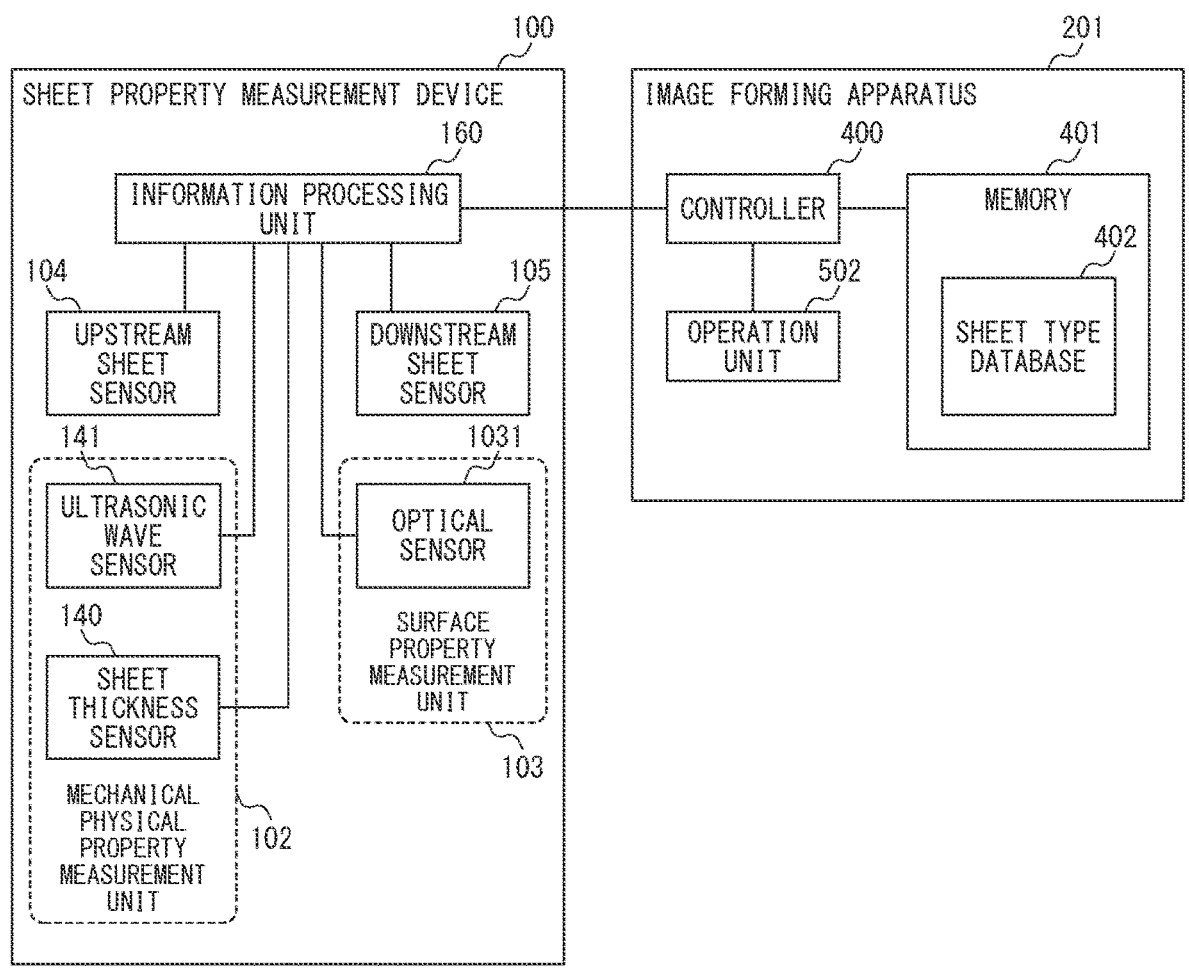
FIG. 3 is an explanatory diagram of a controller.

FIG. 3 is an explanatory diagram of a controller which controls operation of such image forming apparatus 201. A controller 400 is, for example, an information processing device including a central processing unit (CPU). The controller 400 may be achieved by, for example, a microprocessor unit (MPU) or an application specific integrated circuit (ASIC). The controller 400 controls the above-mentioned image forming processing performed by the image forming apparatus 201. Further, in this embodiment, the controller 400 is connected to the sheet property measurement device 100 and controls the sheet property measurement device 100. A memory 401 and the operation unit 502 are connected to the controller 400. The memory 401 includes a sheet type database 402. The sheet type database 402 stores pieces of information such as physical property values of various brands of sheets, image forming conditions at the time of image formation, whether or not to allow passage of sheets in the image forming apparatus 201, and usable sheet feeding ports.

The sheet property measurement device 100 includes an information processing unit 160. The information processing unit 160 is an information processing device achieved by, for example, a CPU, an MPU, or an ASIC. The information processing unit 160 is communicably connected to the controller 400 and can operate in cooperation with the controller 400. The information processing unit 160 has an upstream sheet sensor 104, a downstream sheet sensor 105, a mechanical physical property measurement unit 102, and a surface property measurement unit 103 connected thereto. The mechanical physical property measurement unit 102 includes an ultrasonic wave sensor 141 and a sheet thickness sensor 140. The surface property measurement unit 103 includes an optical sensor 1031. The information processing unit 160 controls operations of the upstream sheet sensor 104, the downstream sheet sensor 105, the mechanical physical property measurement unit 102, and the surface property measurement unit 103 and acquires respective measurement results.

<Type of Sheet Used in Image Forming Apparatus>

Image forming conditions given at the time of image forming processing (for example, conveyance speed and fixing temperature given at the time of fixing, and transfer voltage given at the time of secondary transfer) differ depending on physical properties, such as a basis weight, a stiffness, a surface property, and a material, of the sheet S subjected to image formation. Thus, it is important to grasp in advance a type of the sheet S to be used at the time of image formation.

There may be some limitations in setting the sheet S to a sheet feeding port. The sheet feeding port is the sheet-feeding cassette 1 or the manual feeding tray 5. For example, some thick paper sheets having a high stiffness can be fed only from the manual feeding tray 5 with a conveyance path having a small curvature. Coated paper sheets having a smooth surface texture and a strong adhesion between sheets are required to be fed one by one from the manual feeding tray 5. Paper sheets made of pulp as a raw material generally have different bending stiffnesses in length and width directions because of bias in orientation directions of pulp fibers (fiber orientation) that occurs due to a manufacturing method. Thus, for some paper sheets made of pulp as a raw material, there is given a recommended orientation of the sheet in length and width directions at the time of setting the sheet to the sheet feeding port so that the bending stiffness against the bending in the conveyance path becomes smaller. Further, for one-side coated paper sheets obtained by coating only one side of a plain paper sheet, an orientation in up-and-down directions is designated at the time of setting in order to perform image formation on the coated side.

There are also some sheets which cannot be used in the image forming apparatus 201. For example, in a case of a thick paper sheet having an excessively high stiffness, conveyance of the sheet may be stopped due to resistance generated at the time of conveying the sheet along a bent conveyance path. A thin paper sheet having an excessively low stiffness is strongly affected by the sticking force generated between the melted toner and the heating roller 220b at the time of passage through the fixing device 201E as described above. Thus, there is a possibility that a paper sheet having an excessively low stiffness is not separated from the heating roller 220b by the separation plate 202 and is directly wound around the heating roller 220b (FIG. 2B). Further, in a case of a synthetic paper sheet which is not made of pulp but of a synthetic resin as a raw material, there is a possibility that the sheet is melted by heating in the fixing device 201E and thereby contaminate the heating roller 220b.

<Sheet Property Measurement Device>

Figure 4A:
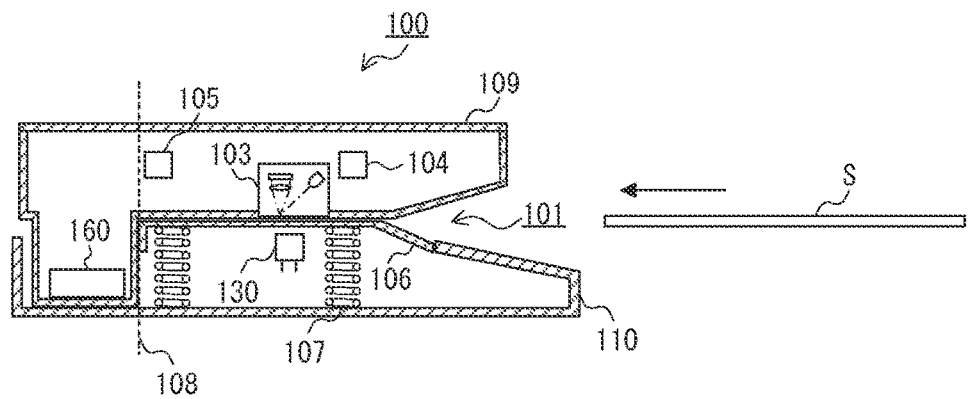
FIG. 4A and FIG. 4B are explanatory views of a sheet property measurement device.
Figure 4B:
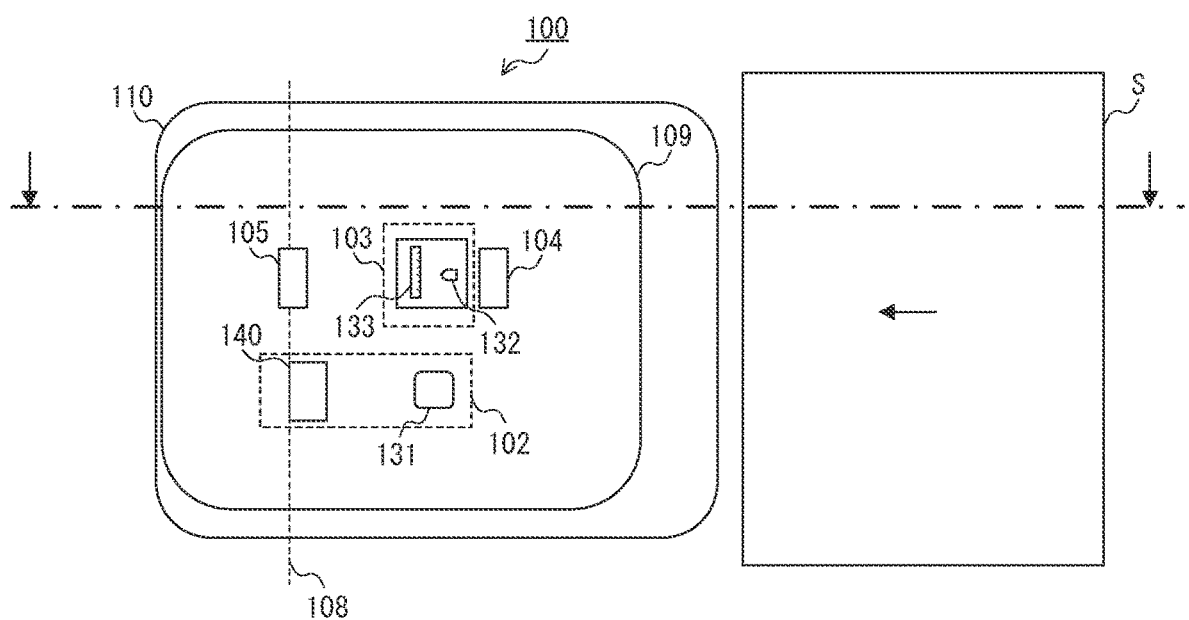
Figure 5A:
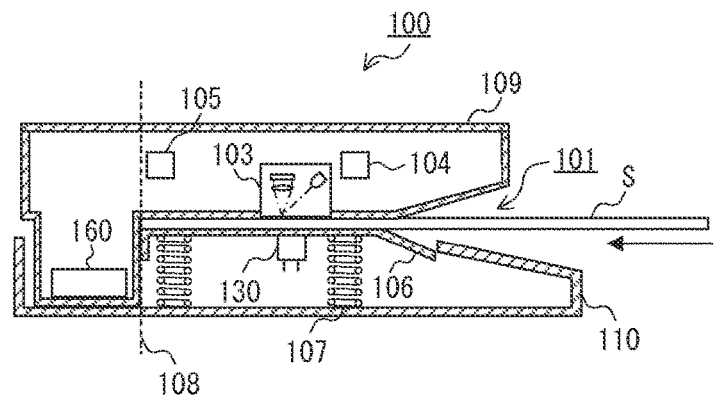
FIG. 5A and FIG. 5B are explanatory views of the sheet property measurement device.
Figure 5B:
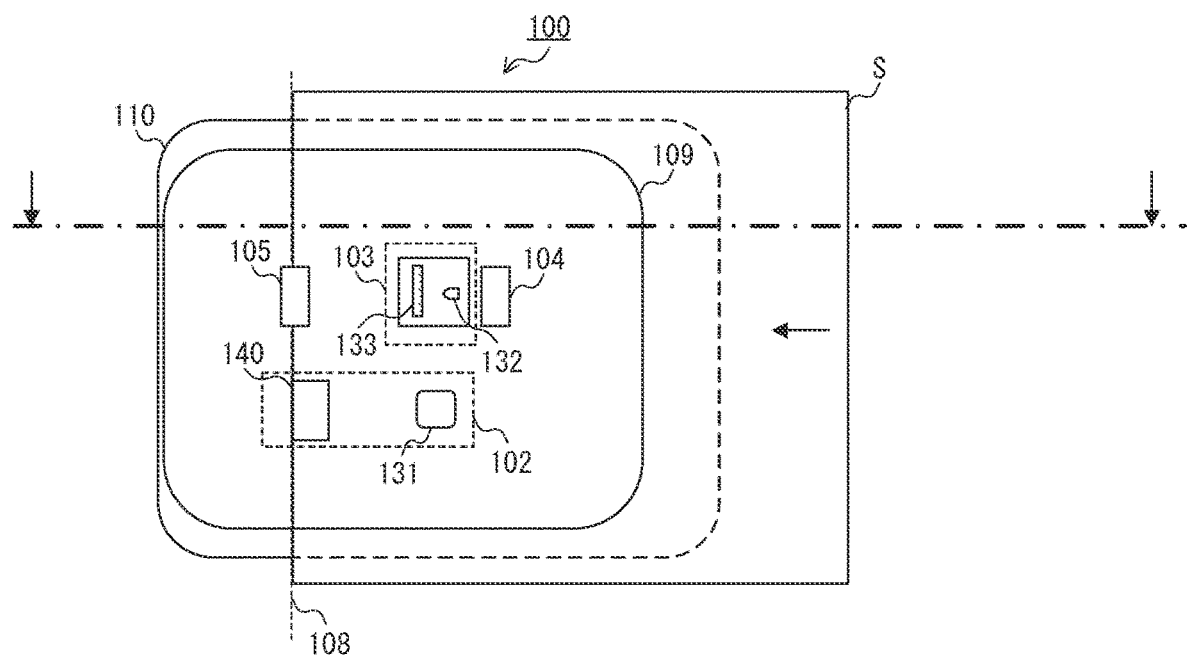
Figure 6:
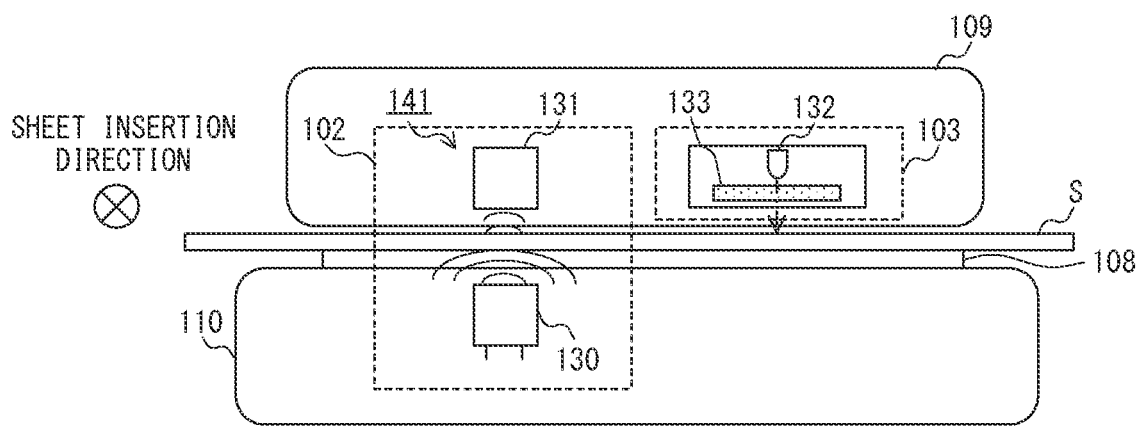
FIG. 6 is an explanatory view of the sheet property measurement device.

FIG. 4A, FIG. 4B, FIG. 5A, FIG. 5B, and FIG. 6 are explanatory views of the sheet property measurement device 100. FIG. 4A and FIG. 4B show a state before the sheet S is inserted into the sheet property measurement device 100. FIG. 5A and FIG. 5B show a state in which the sheet S has been inserted into the sheet property measurement device 100. FIG. 4A and FIG. 5A are views of the sheet property measurement device 100 as seen from a lateral side (front side of the image forming apparatus 201 of FIG. 1). FIG. 4B and FIG. 5B are views of the sheet property measurement device 100 as seen from an upper side. FIG. 6 is a view of the sheet property measurement device 100 as seen in an insertion direction of the sheet S.

The sheet property measurement device 100 has a groove portion 101 serving as a passage configured to allow the sheet S subjected to identification to be inserted thereinto, and measures physical property values of the sheet S inserted from the groove portion 101. The insertion of the sheet S is performed manually by a user. The groove portion 101 includes an upper block 109 in an upper part and a lower block 110 in a lower part.

On a groove-portion inner side of the lower block 110, a sheet pressing member 106 is provided. The sheet pressing member 106 is urged by an urging member 107 toward the upper block 109 side. The sheet S is inserted while pushing away the sheet pressing member 106 downward. The upper block 109 projects at an end portion of the sheet pressing member 106 (innermost portion to which the sheet S can be inserted) toward the lower block 110 side, thereby forming an abutment portion 108. The abutment portion 108 restricts the insertion of the sheet S. Thus, the sheet S can be inserted to the abutment portion 108. The information processing unit 160 is arranged on an inner side beyond the abutment portion 108.

The measurement unit for the physical property values of the sheet S includes the mechanical physical property measurement unit 102 and the surface property measurement unit 103. As the sheet S passes through the measurement unit, physical property values of the sheet S, such as a basis weight, a surface property, and a sheet thickness, are acquired. The upstream sheet sensor 104 is arranged on an upstream side of the surface property measurement unit 103 in the insertion direction of the sheet S. The downstream sheet sensor 105 is arranged in the vicinity of the abutment portion 108 on the upstream side in the insertion direction of the sheet S. That is, the upstream sheet sensor 104 is arranged at an insertion start position of the sheet S, and the downstream sheet sensor 105 is arranged at an insertion end position of the sheet S. The upstream sheet sensor 104 and the downstream sheet sensor 105 each detect the inserted sheet S. The upstream sheet sensor 104 detects the sheet S that has arrived at the insertion start position, and the downstream sheet sensor 105 detects the sheet S that has arrived at the insertion end position.

In the mechanical physical property measurement unit 102, as illustrated in FIG. 6, there are provided an ultrasonic wave emitter 130 on the lower block 110 side and an ultrasonic wave receiver 131 on the upper block 109 side such that the ultrasonic wave emitter 130 and the ultrasonic wave receiver 131 are arranged across an insertion passage along which the sheet S is to be inserted. The ultrasonic wave emitter 130 and the ultrasonic wave receiver 131 form the ultrasonic wave sensor 141. The mechanical physical property measurement unit 102 transmits and receives ultrasonic waves with the ultrasonic wave sensor 141 via the insertion passage of the sheet S, thereby being capable of detecting a basis weight of the sheet S. The basis weight is a mass of the sheet S per unit area, and is represented by a unit "gsm".

The ultrasonic wave emitter 130 and the ultrasonic wave receiver 131 are each formed of a piezoelectric element (also referred to as "piezo element"), which is an element for mutual conversion between a mechanical displacement and an electric signal, and an electrode terminal. The ultrasonic wave emitter 130 generates ultrasonic waves through oscillation of the piezoelectric element in response to input of a pulse voltage having a predetermined frequency to the electrode terminal. The generated ultrasonic waves propagate through air. Upon arrival of the ultrasonic waves to the sheet S, the ultrasonic waves cause the sheet S to vibrate. The ultrasonic waves generated in the ultrasonic wave emitter 130 propagate to the ultrasonic wave receiver 131 via the sheet S. The piezoelectric element of the ultrasonic wave receiver 131 causes the electrode terminal to generate an output voltage corresponding to an amplitude of the received ultrasonic waves. The output voltage has a value corresponding to the basis weight of the sheet S. The output voltage is transmitted as a measurement value to the information processing unit 160.

As compared to a case in which the sheet S is absent between the ultrasonic wave emitter 130 and the ultrasonic wave receiver 131, the output voltage generated by the ultrasonic waves transmitted via the sheet S is reduced. The information processing unit 160 calculates a transmittance of the sheet S in accordance with a ratio of an output voltage given in the presence of the sheet S and an output voltage given in the absence of the sheet S. The transmittance of the ultrasonic waves varies depending on a thickness of the sheet S. Thus, the information processing unit 160 can estimate the basis weight of the sheet S with a conversion formula for an ultrasonic wave transmittance coefficient and a basis weight. In this way, the basis weight of the sheet S is detected with the ultrasonic wave sensor 141.

The upstream sheet sensor 104 which is provided in the upper block 109 and located on the upstream side of the surface property measurement unit 103 in the insertion direction of the sheet S detects insertion of the sheet S into the sheet property measurement device 100. The downstream sheet sensor 105 which is provided in the upper block 109 and located on the downstream side of the surface property measurement unit 103 in the insertion direction of the sheet S detects arrival of the sheet S at the abutment portion 108 provided at a position at which the sheet S has been completely inserted into the sheet property measurement device 100.

The sheet thickness sensor 140 is arranged near the abutment portion 108. The sheet thickness sensor 140 is of a lever type. In the sheet thickness sensor 140, a lever tilts in accordance with a thickness of the sheet S so that an encoder coordinating with the lever rotates in accordance with the tilting amount of the lever. The lever has an angle relative to the insertion direction of the sheet S, and the angle changes by inserting the sheet S since the lever is pushed by the sheet S. In this case, the angle of the lever changes depending on the thickness of the sheet S. The encoder functions as a detection unit for detecting a displacement amount of an angle of the lever. During rotation of the encoder, the sheet thickness sensor 140 transmits a pulse signal as a measurement value of the sheet thickness to the information processing unit 160. The pulse signal is a signal corresponding to the displacement amount of the angle of the lever. The sheet thickness sensor 140 is arranged somewhat on the downstream side in the insertion direction of the sheet S with respect to the downstream sheet sensor 105 so that the sheet thickness can be measured upon detection of the sheet S by the downstream sheet sensor 105.

As described above, the surface property measurement unit 103 includes the optical sensor 1031 for reading the surface of the sheet S. The optical sensor 1031 includes a light emitter 132, an optical system, and a line sensor 133. The light emitter 132 is, for example, a light emitted diode (LED). The optical system is formed of a combination of lenses, mirrors, and the like. The line sensor 133 is formed of an array of a plurality of light receiving elements. For example, the line sensor 133 is a CMOS line sensor including CMOS sensors as light receiving elements.

As illustrated in FIG. 6, the surface property measurement unit 103 (optical sensor 1031) includes the light emitter 132 and the line sensor 133 on the upper block 109 side. The light emitter 132 and the line sensor 133 are arranged in the sheet property measurement device 100 in alignment with each other in a direction orthogonal to the insertion direction of the sheet S. Thus, the line sensor 133 detects the surface of the sheet S along one line in the direction orthogonal to the insertion direction of the sheet S. The line sensor 133 is capable of detecting a sheet surface region with a resolution corresponding to a pixel size and an imaging magnification of the optical system. One pixel corresponds to one light receiving element. In this embodiment, the line sensor 133 with 400 pixels is provided. The surface property measurement unit 103 has a sheet surface detection resolution of 300 dpi. A scan (accumulation) time per line is assumed to be 500 microseconds.

The surface property measurement unit 103 is required to hold the sheet S at an optical focus position. Thus, the urging member 107 urges the sheet S toward the surface property measurement unit 103 side, and the sheet pressing member 106 stabilizes a posture of the sheet S. In this way, the surface property measurement unit 103 reduces variation in position and posture of the sheet S at the time of detecting the surface of the sheet S, and hence the surface property measurement unit 103 can stably detect the surface property (property of the surface of the sheet S). The urging member 107 is set so as to press the inserted sheet S toward the surface property measurement unit 103 side with a force of about 100 gf.

The light emitter 132 of the surface property measurement unit 103 is configured to emit irradiation light onto the surface of the sheet S at a shallow angle of 10 to 30 degrees. The light emitted by the light emitter 132 causes shadows corresponding to unevenness of the surface of the sheet S. The line sensor 133 reads the shadows. The line sensor 133 transmits an electric signal representing a reading result (detection result) to the information processing unit 160. The light receiving element is, for example, a photoelectric conversion element, and can output an electric signal corresponding to received light reflected from the sheet S. The information processing unit 160 acquires parameters for determining a degree of unevenness, a reflectance, and other such surface properties of the sheet S by arithmetically processing the electric signal (detection value) for each pixel (for each light receiving element).

The surface property measurement unit 103 can detect information on an area corresponding to one line by the line sensor 133. Thus, the information processing unit 160 can process the information on the area in accordance with a purpose and extract the parameters for determining the surface properties of the sheet S. In this manner, the surface property measurement unit 103 in this embodiment is excellent in ability to acquire information corresponding to physical properties of the sheet S. This enables the properties of the sheet S to be obtained more accurately than in a case in which information regarding a point is read by a single light receiving element.

Figure 7A:
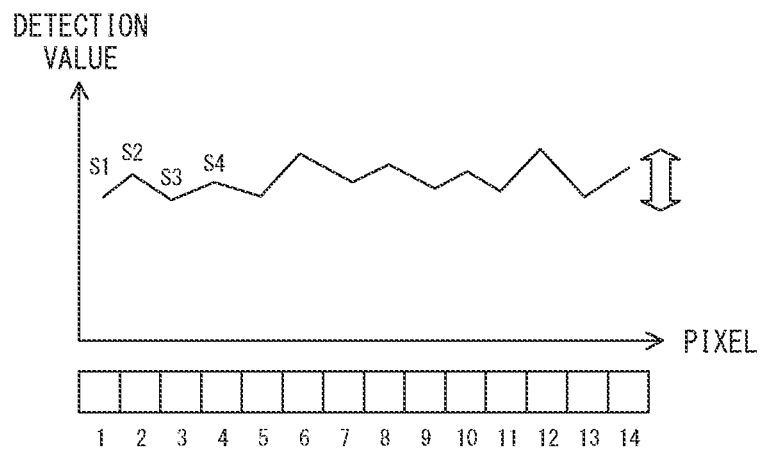
FIG. 7A and FIG. 7B are graphs each showing a relationship between surface properties of a sheet and detection values of an optical sensor.
Figure 7B:
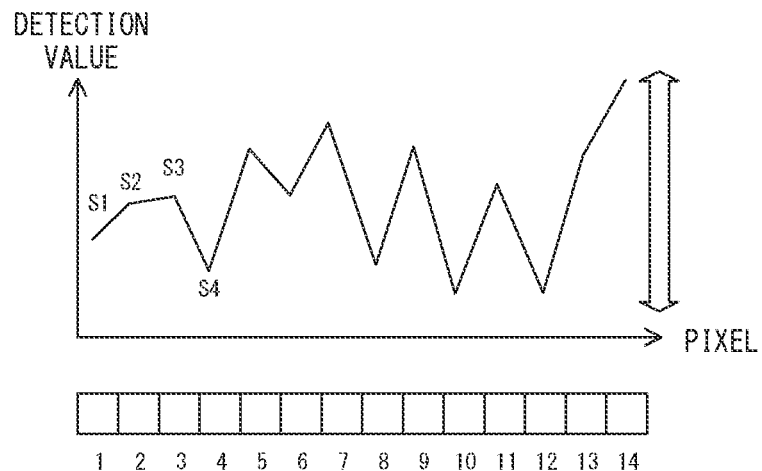

FIG. 7A and FIG. 7B are graphs each showing a relationship between the surface properties of the sheet S and the detection values of the optical sensor 1031. FIG. 7A shows detection values obtained when the line sensor 133 reads a sheet S having a high smoothness and having a smooth surface. FIG. 7B shows detection values obtained when the line sensor 133 reads a sheet S having a low smoothness and having a large unevenness in the surface, such as an embossed paper sheet. FIG. 7A and FIG. 7B each show a graph in which the detection values of the respective pixels of the line sensor 133 are connected by lines. In the graph of FIG. 7A, due to the small unevenness of the surface of the sheet S, differences in shades of the shadows caused by the irradiation of light from the light emitter 132 are small, and a change in the detection value for each pixel is small. In the graph of FIG. 7B, due to the sheet S having a large unevenness in the surface, such as an embossed paper sheet, the differences in shades of the shadows are large, and the change in the detection value for each pixel is large.

Assuming that the detection values of the respective pixels are S1, S2, ... S400, a difference integrated value E is calculated as a parameter corresponding to the smoothness by summing up the differences between the detection values of adjacent pixels as in Expression 1 given below.

$$(S2-S1)+(S3-S2)+(S4-S3)+(S5-S4)\ldots+(S400-S399)=\text{(difference integrated value }E\text{)} \quad \text{(Expression 1)}$$

When the sheet S having a high smoothness and having a smooth surface is read, the differences between the detection values of the adjacent pixels are small, and hence the difference integrated value E is small. When the sheet S having a large unevenness in the surface and having a low smoothness is read, the differences between the detection values of the adjacent pixels are large, and hence the difference integrated value E is large. Thus, the difference integrated value E, which is the parameter representing the surface properties, is obtained based on the degree of unevenness of the surface of the sheet S.

The unevenness of the surface of the sheet S varies from position to position within a plane of one sheet S. Thus, in order to accurately detect the degree of unevenness of one sheet S, the optical sensor 1031 is required to read a region having a predetermined size or more. For example, when the sheet S is read in a stationary state, a state of unevenness of the sheet S can be read only in a region corresponding to one line of the line sensor 133 (84 µm with respect to the insertion direction due to 300 dpi). In this case, a large influence of a local unevenness of the sheet S is caused, and deviations between the detection values of respective reading positions are large. Therefore, the difference integrated value based on the detection values of one line is not suitable for detecting the surface properties.

Figure 8:
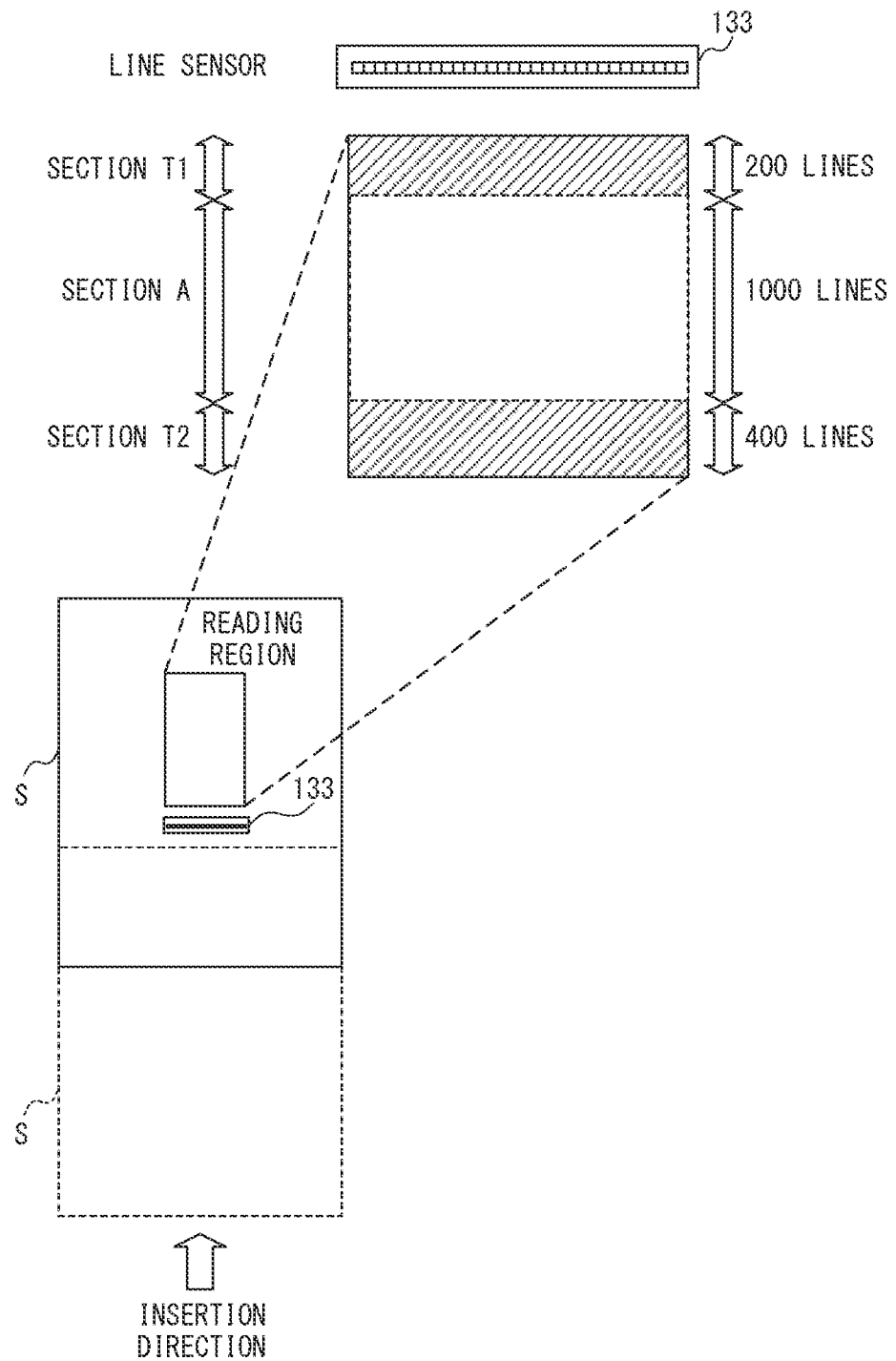
FIG. 8 is an explanatory view of an area to be read.

In this embodiment, in order to read a predetermined size or more of the surface of the sheet S, the optical sensor 1031 continuously reads a predetermined number of lines (here, several hundreds of lines) during movement of the sheet S while the user is inserting the sheet S. Such reading during the movement of the sheet S is called "reading during conveyance." Through the reading during conveyance, a predetermined-size area of the surface of the sheet S is read. FIG. 8 is an explanatory view of an area to be read by the reading during conveyance. In order to obtain a highly accurate detection value by the reading during conveyance, in the sheet property measurement device 100 according to this embodiment, the upstream sheet sensor 104 is provided on the upstream side of the surface property measurement unit 103 in the insertion direction of the sheet S, and the downstream sheet sensor 105 is provided on the downstream side of the surface property measurement unit 103 in the insertion direction of the sheet S.

In FIG. 8, while the sheet S is being moved by the user inserting the sheet S, the optical sensor 1031 reads a predetermined region of the sheet S by the reading during conveyance. With this, the detection values of a wide region of the surface of the sheet S corresponding to the movement during the insertion are obtained. A value obtained by averaging the difference integrated values E of the respective lines is set as an unevenness surface property detection value. An unevenness surface property detection value R is calculated by Expression 2 given below. The unevenness surface property detection value R is a parameter corresponding to a stable physical property of smoothness, in which influences of variations in unevenness at the respective positions in the plane of the sheet S are reduced. In FIG. 8, 1,600 lines are measured from a time point at which the sheet S is inserted by the user.

$$(E1+E2+\ldots EN)/N=R \quad \text{(Expression 2)}$$

E: difference integrated value
E1: difference integrated value of first line
N: number of measurement lines
R: unevenness surface property detection value When the user manually inserts the sheet S, a moving speed of the inserted sheet S is not constant. When the moving speed of the sheet S varies, a reading region of the sheet S expands and contracts during the reading of one line, and the difference integrated value E of one line varies. In particular, at a time point at which the user start insertion of the sheet S into the sheet property measurement device 100, the sheet S may be unstably held near an inlet (near the groove portion 101), and an insertion speed significantly varies, with the result that the difference integrated value E is not stable. Further, before the sheet S abuts against the innermost abutment portion 108, the moving speed of the sheet S is changed due to a sense of resistance of the sheet S passing through the sheet thickness sensor 140. Further, the difference integrated value E of one line obtained when the sheet S is stopped by abutting against the abutment portion 108 is different from the difference integrated value E of one line obtained while the sheet S is being smoothly inserted due to a width of the reading region being different from that obtained when the sheet S is being manually inserted.

As a result, as illustrated in FIG. 8, the reading region expands and contracts in each of a leading end region in which a leading end of the sheet S is present near the inlet, a region immediately before the sheet S abuts against the abutment portion 108, and a trailing end region in which the sheet S abuts against the abutment portion 108 to be stopped. Thus, those regions are not suitable for acquiring the difference integrated value E. In FIG. 8, a section T1 and a section T2 are sections indicating such regions that are not suitable for acquiring the difference integrated value E.

First Embodiment

Figures 9, 10:
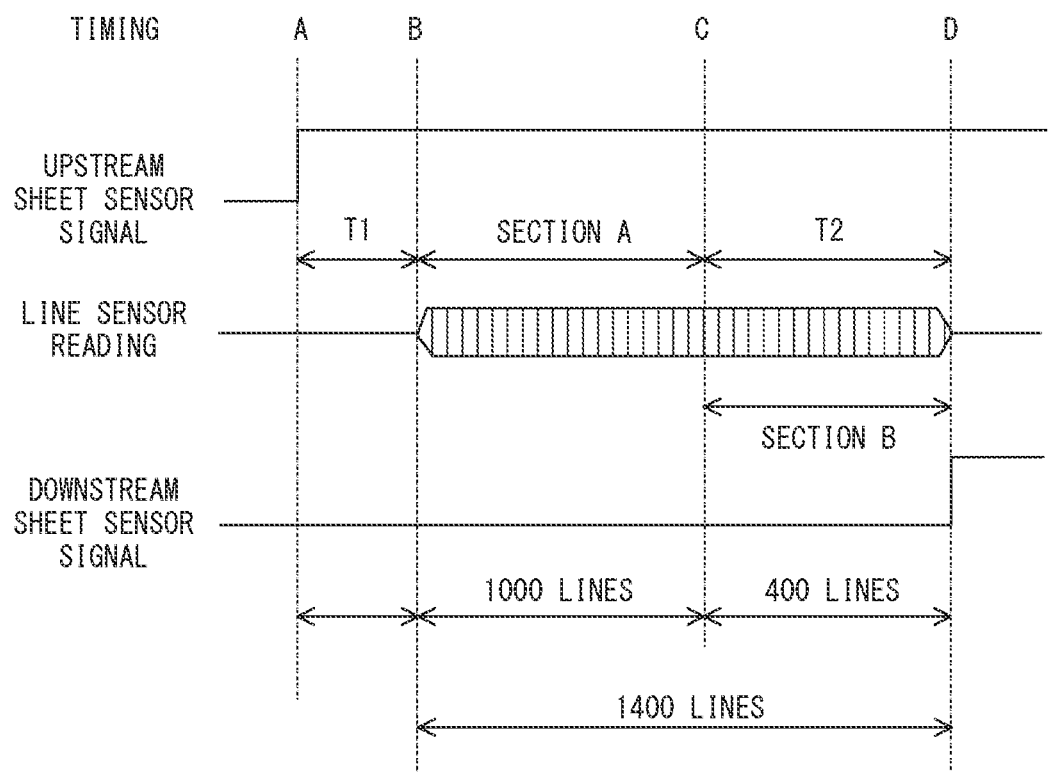
FIG. 9 is a timing chart for determining a region for calculating a difference integrated value.
FIG. 10 is an illustrative table for showing a memory space and data stored in each address in a memory.

In a first embodiment of the present disclosure, the difference integrated value E is calculated through use of the detection values of the region read by the line sensor 133 while the user is manually inserting the sheet S smoothly. The information processing unit 160 determines a region in which the moving speed (insertion speed) of the sheet S is the most stable based on timings at which the upstream sheet sensor 104 and the downstream sheet sensor 105 detect the sheet S. The information processing unit 160 determines this region as a region for calculating the difference integrated value E. In FIG. 8, a section A is such a region suitable for acquiring the difference integrated value E. FIG. 9 is a timing chart for determining such a region suitable for acquiring the difference integrated value E.

A reading start timing of the optical sensor 1031 is determined based on a timing at which the sheet S is detected by the upstream sheet sensor 104. The optical sensor 1031 starts reading of the sheet S after a time corresponding to the section T1 has elapsed since the upstream sheet sensor 104 detects the sheet S. The time corresponding to the section T1 is determined by a shape of the sheet property measurement device 100. After an insertion test for the sheet S is repeatedly performed, the time corresponding to the section T1 is determined based on a time considered to be optimal for the difference integrated value E to be stabilized. The optical sensor 1031 reads the sheet S based on the accumulation time (500 microseconds) per line.

At a timing at which the leading end of the sheet S arrives at the detection position of the downstream sheet sensor 105 through the insertion by the user and the downstream sheet sensor 105 detects the sheet S, the optical sensor 1031 finishes reading of the sheet S. At this time, the information processing unit 160 processes, on a pixel-by-pixel basis, the detection values corresponding to one line obtained every 500 microseconds, converts the detection values into the difference integrated value E, and sequentially stores the difference integrated value E in the internal memory on a line-by-line basis. In this case, the line-by-line-based difference integrated values E corresponding to 1,400 lines are stored. The number of lines to be stored (in this case, 1,400 lines) varies depending on a speed at which the sheet S is inserted by the user. Due to the dependence of the number of lines to be stored on the speed at which the sheet S is inserted by the user, the number of lines to be stored changes every time automatic sheet type identification is executed.

The section A is a section in which the user can insert the sheet S at a speed closest to a constant speed, and the detection values obtained in the section A are optimal for calculating the difference integrated value E. Thus, the determination of the surface properties of one sheet S is performed by excluding the detection values of lines in the number of which corresponds to the time corresponding to the section T2 before a timing D at which the downstream sheet sensor 105 detects the sheet S. After the insertion test for the sheet S is repeatedly performed, the time corresponding to the section T2 is determined based on a time at which the insertion speed of the sheet S becomes unstable near the abutment portion 108.

FIG. 10 is an illustrative table for showing a memory space of the information processing unit 160 and data stored in each address in the memory. When the reading of the sheet S is started, the information processing unit 160 sequentially acquires the detection values from the line sensor 133, and arithmetically operates the difference integrated value E on a line by line basis. The information processing unit 160 sequentially stores the calculated difference integrated value E corresponding to one line in the internal memory. The sheet S before passing through the detection position of the downstream sheet sensor 105 has an unstable insertion speed. The number of lines that correspond to a time corresponding to the section T2 equivalent to a section B in which the insertion speed is unstable is 400 lines. The information processing unit 160 avoids using 400 lines at the trailing end among the detection values of the 1,400 lines, and sets a value obtained by averaging the difference integrated values E corresponding to 1,000 lines at the leading end as the unevenness surface property detection value of the sheet S.

In other words, when the difference integrated values E corresponding to 1,400 lines are stored, the information processing unit 160 excludes pieces of data (difference integrated values E) at addresses 1001 to 1400, and uses pieces of data (difference integrated values E) at addresses 1 to 1000 to calculate the unevenness surface property detection value. In actuality, the number of 1,400 lines to be stored varies depending on the insertion speed by the user. Thus, the pieces of data (difference integrated values E) obtained by excluding the pieces of data (difference integrated values E) preceding by 400 lines from the address of the last stored line is used for the calculation of the unevenness surface property detection value R. The unevenness surface property detection value R is calculated by, for example, Expression 3 given below.

$$E[1]+E[2]+\ldots+E[N-400]/(N-400)=R \qquad \text{(Expression 3)}$$

N: number of stored lines

R: unevenness surface property detection value

For example, 10,000 pieces of data can be stored in a data region of the memory. When more pieces of data (difference integrated values E) are to be stored, the information processing unit 160 determines those pieces of data to be invalid data, and prompts the user to reinsert the sheet S. For example, when the upstream sheet sensor 104 detects the sheet S and the downstream sheet sensor 105 does not detect the sheet S, the information processing unit 160 determines that the data is invalid. In this case, the information processing unit 160 transmits, to the controller 400 of the image forming apparatus 201, an instruction for the user to reinsert the sheet S. The controller 400 displays an instruction to reinsert the sheet S on the display of the operation unit 502 in response to this instruction. In this manner, the information processing unit 160 prompts the user to reinsert the sheet S.

With such a method as described above, the surface properties (unevenness information) of the sheet S manually inserted by the user can be detected with high accuracy through use of the optical sensor 1031. The optical sensor 1031 is used to read a predetermined-size region of the sheet S, to thereby be able to capture features of the surface properties of even the sheet S having a large unevenness in the surface, such as an embossed paper sheet. The sheet property measurement device 100 can identify a wide variety of sheets including an embossed paper sheet by performing the reading during conveyance in order to grasp a tendency of the entire surface of the sheet S, and can support a large number of types of paper sheets.

Figure 11:
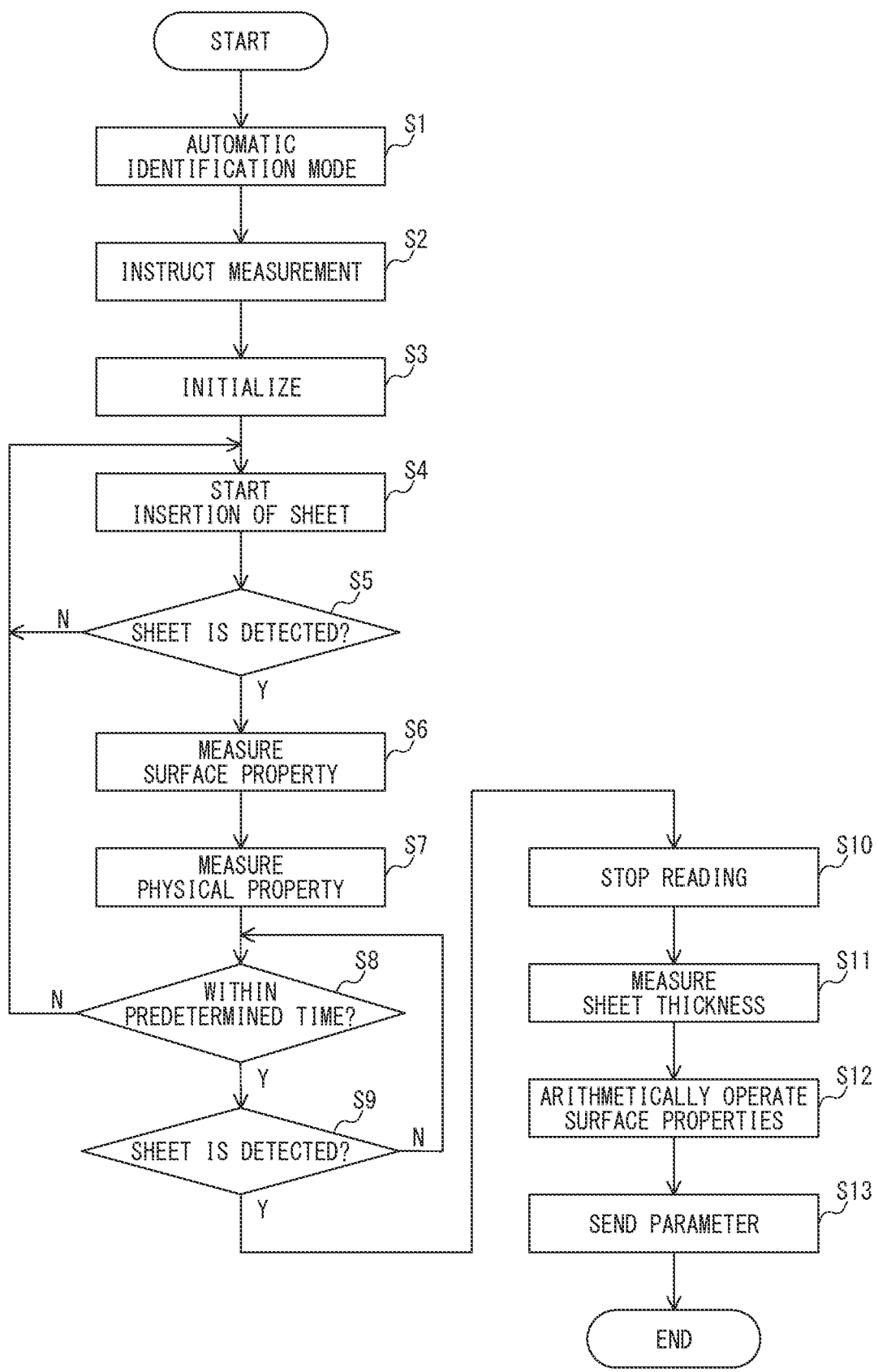
FIG. 11 is a flowchart for illustrating parameter acquisition processing for identifying a sheet type.
Figure 12:
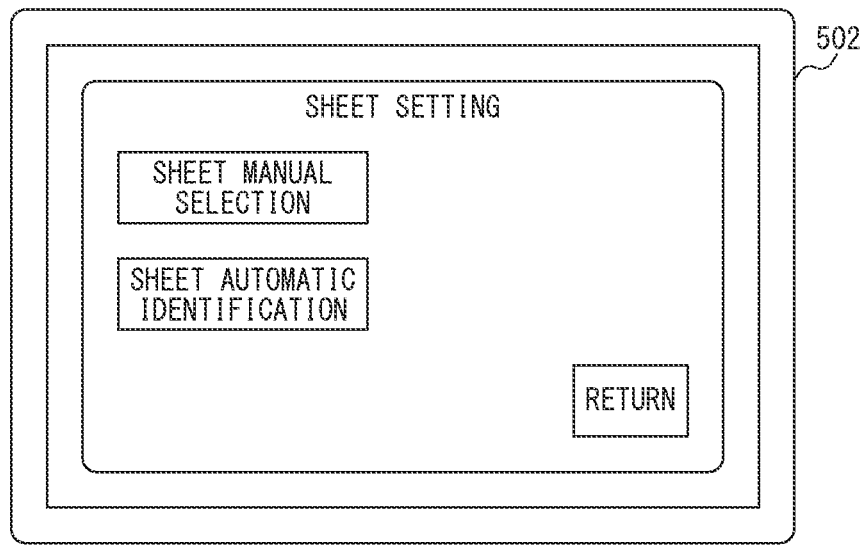
FIG. 12 is an illustrative view of a selection screen of identification processing for a sheet type.

FIG. 11 is a flowchart for illustrating parameter acquisition processing for identifying a sheet type of the sheet S. FIG. 12 is an illustrative view of a selection screen of identification processing for a sheet type of the sheet S. The selection screen is displayed on the display of the operation unit 502. The selection screen includes a "sheet manual selection" button and a "sheet automatic identification" button. The "sheet manual selection" button allows a user to manually input a type of the sheet S. The "sheet automatic identification" button allows the sheet property measurement device 100 to automatically select a plurality of candidates of a type of the sheet S. In this embodiment, in response to selection of the "sheet automatic identification" button by a user from the selection screen with use of the operation unit 502, the selected content is input to the controller 400.

When the controller 400 acquires the information indicating that the "sheet automatic identification" button has been selected from the operation unit 502, the controller 400 sets an operation mode to an automatic identification mode for the sheet S (Step S1). When the operation mode has been set to the automatic identification mode, the controller 400 instructs measurement of the sheet S to the information processing unit 160 of the sheet property measurement device 100, to thereby notify that the operation mode has been shifted to the automatic identification mode for the sheet S (Step S2).

The information processing unit 160 performs initialization processing for the mechanical physical property measurement unit 102 and the surface property measurement unit 103 to be ready for insertion of the sheet S (Step S3). When the user starts insertion of the sheet S into the groove portion 101 (Step S4), the information processing unit 160 waits until the upstream sheet sensor 104 detects the sheet S (Step S5: N). When the upstream sheet sensor 104 detects the sheet S (Step S5: Y), the information processing unit 160 causes the surface property measurement unit 103 (optical sensor 1031) to start measurement of the surface properties of the sheet S after the time corresponding to the section T1 has elapsed (Step S6). The information processing unit 160 causes the optical sensor 1031 to read the sheet S a plurality of times, and sequentially acquires the reading results (detection values). The information processing unit 160 sequentially converts the detection values into the difference integrated values E on a line-by-line basis, and stores the line-by-line-based difference integrated values E in the memory included in the information processing unit 160. This memory is, for example, a random access memory (RAM). In addition, the information processing unit 160 simultaneously calculates a brightness, which is a total sum value of the pieces of data on the respective pixels, based on the reading results (detection values) obtained by the optical sensor 1031, and stores the brightness in the memory. In this manner, through the measurement of the surface properties, the line-by-line-based difference integrated values E and brightnesses are accumulated in the memory of the information processing unit 160.

Figure 13:
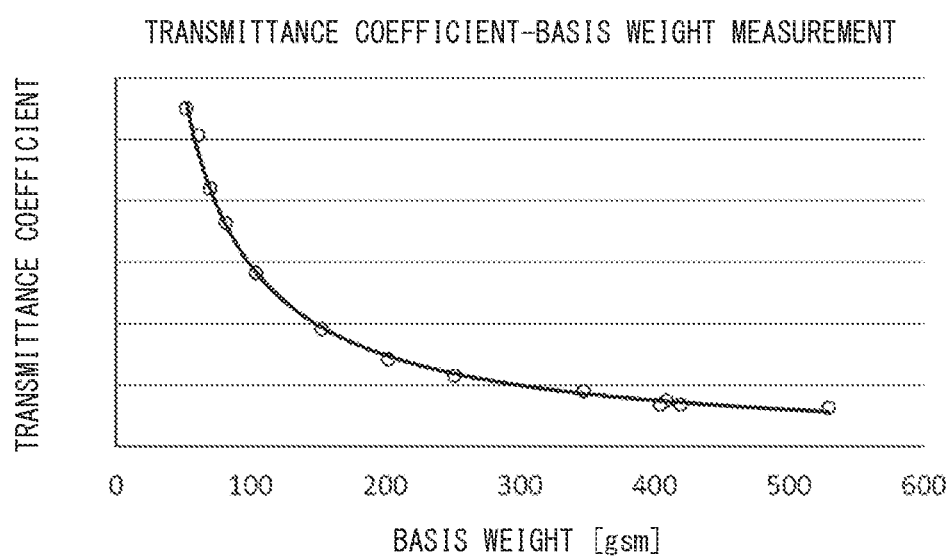
FIG. 13 is an explanatory graph of a relationship between a transmittance of ultrasonic waves and a basis weight.

The information processing unit 160 starts measurement of physical properties of the sheet S with use of the mechanical physical property measurement unit 102 (Step S7). The information processing unit 160 measures a transmittance of the sheet S for ultrasonic waves with use of the ultrasonic wave sensor 141, converts the measurement values into pieces of basis weight information, and accumulates the pieces of basis weight information in the memory. FIG. 13 is an explanatory graph of a relationship between the transmittance of ultrasonic waves and the basis weight. The information processing unit 160 holds a conversion formula or a conversion table indicating such relationship between the transmittance of ultrasonic waves and the basis weight. The information processing unit 160 performs the conversion of the measured value into the basis weight with use of such conversion formula or conversion table. As a result, measurement of physical properties, the basis weight of the sheet S is stored in the memory of the information processing unit 160.

The information processing unit 160 measures a time that has elapsed since the upstream sheet sensor 104 detects the sheet S. When the time that has elapsed since the upstream sheet sensor 104 detects the sheet S has passed a predetermined time or more (Step S8: N) and the downstream sheet sensor 105 has not detected the sheet S, the information processing unit 160 determines, as invalid data, the information that has been stored in the memory since then. In this case, the information processing unit 160 returns the process to the processing step of Step S4 to instruct the user to reinsert the sheet S. In addition, the line-by-line-based difference integrated values E, brightnesses, and basis weights that have been accumulated in the memory of the information processing unit 160 are deleted.

When the time that has elapsed since the upstream sheet sensor 104 detects the sheet S is within the predetermined time (Step S8: Y), the information processing unit 160 checks whether or not the downstream sheet sensor 105 has detected the sheet S (Step S9). The downstream sheet sensor 105 detects the sheet S when the sheet S is inserted up to the innermost abutment portion 108. When the downstream sheet sensor 105 has not detected the sheet S (Step S9: N), the information processing unit 160 returns the process to the processing step of Step S8. That is, the information processing unit 160 determines whether or not to delete the data accumulated in the memory based on whether or not the downstream sheet sensor 105 has detected the sheet S within a predetermined time after the upstream sheet sensor 104 has detected the sheet S. When the downstream sheet sensor 105 has detected the sheet S (Step S9: Y), the information processing unit 160 stops reading of the sheet S by the optical sensor 1031 of the surface property measurement unit 103 (Step S10).

The information processing unit 160 acquires the pulse signal, which is the measurement value, from the sheet thickness sensor 140 while the sheet S is in a stationary state after having been caused to abut against the abutment portion 108. The information processing unit 160 measures the sheet thickness of the sheet S based on the number of acquired pulse signals (pulse count) (Step S11). The sheet thickness of the sheet S is stored in the memory of the information processing unit 160.

The information processing unit 160 calculates the unevenness surface property detection value R based on reading results obtained by excluding the reading results for a predetermined period from the plurality of reading results (difference integrated values E) accumulated in the memory (Step S12). In Step S12, the information processing unit 160 performs an arithmetic process of excluding pieces of data corresponding to the number of lines preceding, by a predetermined time, a timing at which the sheet S is detected by the downstream sheet sensor 105, calculating an average value of the difference integrated values E of the other lines, and converting the average value into the unevenness surface property detection value R. The information processing unit 160 transmits, to the controller 400 of the image forming apparatus 201, parameters such as the basis weights, brightnesses, and sheet thicknesses that are stored in the memory and the calculated unevenness surface property detection value R together with end information indicating that the process has ended (Step S13). Those parameters are information for identifying the type of the sheet S.

Figure 14:
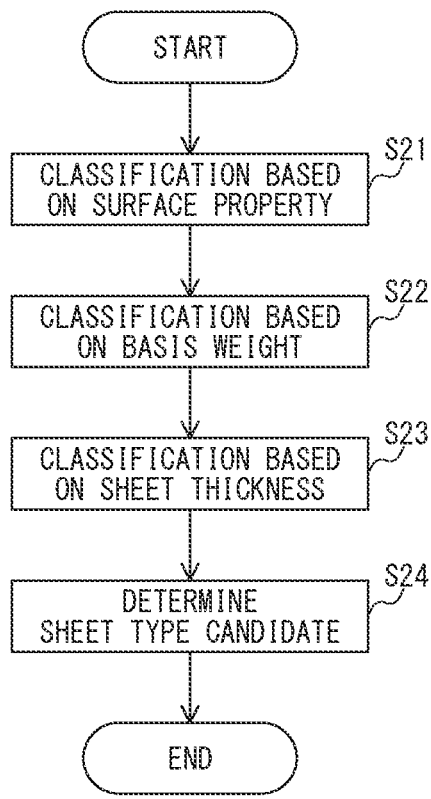
FIG. 14 is a flowchart for illustrating sheet type identification processing.

The controller 400 identifies a type of the sheet S based on the parameters having been acquired from the information processing unit 160. FIG. 14 is a flowchart for illustrating sheet type identification processing.

Figure 15:
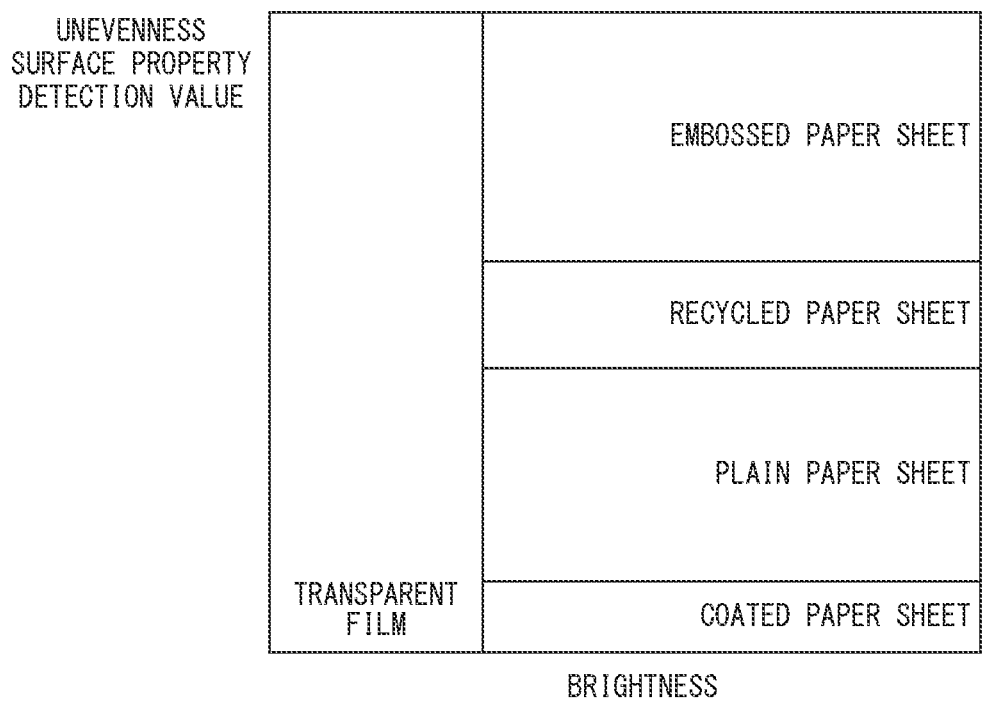
FIG. 15 is an explanatory diagram of classification of the surface properties.

The controller 400 performs classification of a type of the sheet S based on the measurement results of the surface property of the sheet S (Step S21). FIG. 15 is an explanatory diagram of the classification of the surface properties. In FIG. 15, surface properties of the sheets S having respective features are measured and classified in advance with use of a matrix including the vertical axis representing the unevenness surface property detection value R and the horizontal axis representing the brightness as indices of surface properties. The controller 400 identifies the type of the sheet S by referring to the matrix based on the unevenness surface property detection value and the brightness that are obtained from the detection value acquired by the optical sensor 1031.

Even sheets of the same brand vary in properties sheet by sheet, and hence it is required to set threshold values for identifying the sheet S while allowing for the variations. In order to improve the identification accuracy, the variations in the detection values of the optical sensor 1031 obtained by reading the sheets S of the same brand are preferred to be small. The unevenness surface property detection value R detected at timings at which the insertion speed of the sheet S is unstable during reading during conveyance varies greatly due to fluttering of the sheet S caused while the user is inserting the sheet S, and is therefore not suitable for improving the identification accuracy. As described above, the unevenness surface property detection value R detected at timings at which the insertion speed of the sheet S is stable varies insignificantly, and is therefore suitable for improving the identification accuracy.

The brightness is an integrated value (brightness) of the detection values of the pixels detected by the line sensor 133, and is a parameter correlated with a reflectance (lightness) of the sheet S. For example, a transparent film made of a resin such as PET has a small amount of reflected light, and hence the brightness is measured as being low. The sheet S having a geometrical irregularity shape on a surface as in a case of an embossed paper sheet has a large luminance difference between adjacent pixels due to the irregularities, and hence the unevenness surface property detection value R is large. A recycled paper sheet has a non-uniform fiber orientation, and pulp fibers are shortened due to several recycling processes. As a result, the measured surface property tends to be rough. The coated paper sheet appears to have less irregularities due to the presence of the coating layer on the surface. As a result, the unevenness surface property detection value R tends to be small.

In this manner, the controller 400 can classify the surface properties of the sheet S from the detection values (brightness information) of the respective pixels of the line sensor 133 and classify the sheets S based on sheet classifications used in the image forming apparatus 201. The controller 400 determines which classification in the matrix of FIG. 15 includes the unevenness surface property detection value R and the brightness, to thereby classify the type of the sheet S based on the surface properties.

The controller 400 adds the basis weight to the classification based on the surface property, to thereby determine a type of the sheet S (Step S22). Adding the basis weight to the parameters for identifying a sheet type enables the controller 400 to more finely classify the sheet S and identify a type of the sheet S. Further, the controller 400 uses the sheet thickness to improve the accuracy for estimation based on the basis weight (Step S23). A coated paper sheet is formed by applying, on a surface of a sheet such as a middle grade paper sheet, a coating material obtained by mixing a white pigment, such as clay (kaolin) or calcium carbonate, and an adhesive (binder) such as starch. The coated paper sheet has a higher density as compared to a printing plain paper sheet containing pulp as a main component, with the result that there is a large error in basis weight conversion using an ultrasonic wave transmittance coefficient-basis weight conversion formula. Thus, with use of the sheet thickness as a parameter for identification of a sheet type at the same time, the identification accuracy for the sheet S is improved. In particular, in order to identify a brand of the sheet S, it is advantageous to add the sheet thickness information. The controller 400 determines candidates of a sheet type of the sheet S based on those parameters (Step S24).

FIG. 16 and FIG. 17 are illustrative views of sheet selection screens given after identification of a sheet type. The sheet selection screens are displayed on the display of the operation unit 502. On the sheet selection screens, a plurality of candidates of the sheet type determined in the processing of Step S24 are displayed. Through the sheet selection screen, a user can select a type of the sheet S to be actually used for printing from the plurality of candidates of the sheet type determined in the processing of Step S24.

The sheet selection screen of FIG. 16 displays types of sheet settings which are selectable for every sheet classification set in advance in the image forming apparatus 201. The sheet S may be classified to a sheet classification different from a nominal basis weight due to variation in basis weight. Thus, on the sheet selection screen, the types of sheets of classifications which are close to the detected sheet classification are also displayed as candidates. In addition, characters of "recommended" are displayed for a plurality of candidates estimated as the sheet type. On the sheet selection screen of FIG. 17, a brand of a sheet is selectable. The sheet setting is performed through designation of a brand of a sheet. A user selects a sheet from a list of those sheet classifications or sheet brands through the operation unit 502 to assign the sheet setting to a sheet feeding stage. In this way, a type of the sheet S is accurately identified, and hence printing with appropriate image forming conditions can be performed.

FIG. 18 and FIG. 19 are illustrative tables of the sheet type database stored in the memory 401 of the image forming apparatus 201. As described above, the sheet type database 402 includes pieces of information such as physical property values of various brands of sheets, optimum parameters of image forming conditions given at the time of image formation, whether or not to allow passage of a sheet in the image forming apparatus 201, and usable sheet feeding ports. The sheet type database 402 stores, in the form of being linked to brand information, as shown in FIG. 19, reference values of a surface property and a sheet thickness measured by the sheet property measurement device 100. The controller 400 refers to those values to determine candidates having the highest similarity, and displays the sheet selection screens of FIG. 16 and FIG. 17 on the display of the operation unit 502. In this way, a user can easily perform sheet setting.

When the sheet brand is determined, the sheet classification is also determined. When the sheet classification is determined, the image forming conditions at the time of image formation, which are to be set for the image forming apparatus 201, are determined based on the sheet type database of FIG. 18. Thus, it is possible to enable accurate sheet setting and formation of an image on the sheet S with an optimum quality by the image forming apparatus 201.

In this embodiment, the information processing unit 160 is provided in the sheet property measurement device 100, and the information processing unit 160 processes the measurement results given by the mechanical physical property measurement unit 102 and the surface property measurement unit 103 and sends the processed results to the controller 400 of the image forming apparatus 201. However, the processing of those measurement results may be performed directly by the controller 400. In this case, the functions of the information processing unit 160 are included in the controller 400. Further, the sheet property measurement device 100 sends the measurement results given by the mechanical physical property measurement unit 102 and the surface property measurement unit 103 directly to the controller 400.

In this embodiment, the image forming apparatus 201 includes the sheet type database 402. However, the sheet property measurement device 100 may include the sheet type database 402. In this case, specification of a brand of the sheet S performed by the controller 400 is performed by the information processing unit 160 of the sheet property measurement device 100. Further, description has been made of the example in which the detection result by the upstream sheet sensor 104 is used as a trigger for starting the process. However, it is also possible to use the detection result by the downstream sheet sensor 105 as a trigger for starting the process. In this case, the surface property measurement is performed at the time of drawing out the sheet S from the sheet property measurement device 100. The encoder rotation of the sheet thickness sensor 140 may be detected in place of the encoder rotation of the downstream sheet sensor 105, and the zone of reading by the surface property measurement unit 130 may be determined based on the timing of the detection.

In the above, description has been made of the example in which the image forming conditions (control parameters) of the image forming apparatus 201 are determined through selection of a sheet classification and a sheet brand in accordance with characteristics detected by the sheet property measurement device 100. The sheet property measurement device 100 may be a sheet physical property measurement device, and may determine control parameters directly from measured feature amounts (physical property values) of a sheet. Further, the sheet type database 402 and the controller 400 may be provided on a cloud. In such a case, as long as the image forming apparatus 201 is connected to the cloud via a network, the latest sheet type setting information and identification algorithm can always be selected.

Second Embodiment

Description is made of a case in which the sheet S is pushed to the innermost abutment portion 108 and is then subjected to measurement while the sheet is being drawn out. This method is employed when the measurement results during the drawing out are stable.

Figure 20:
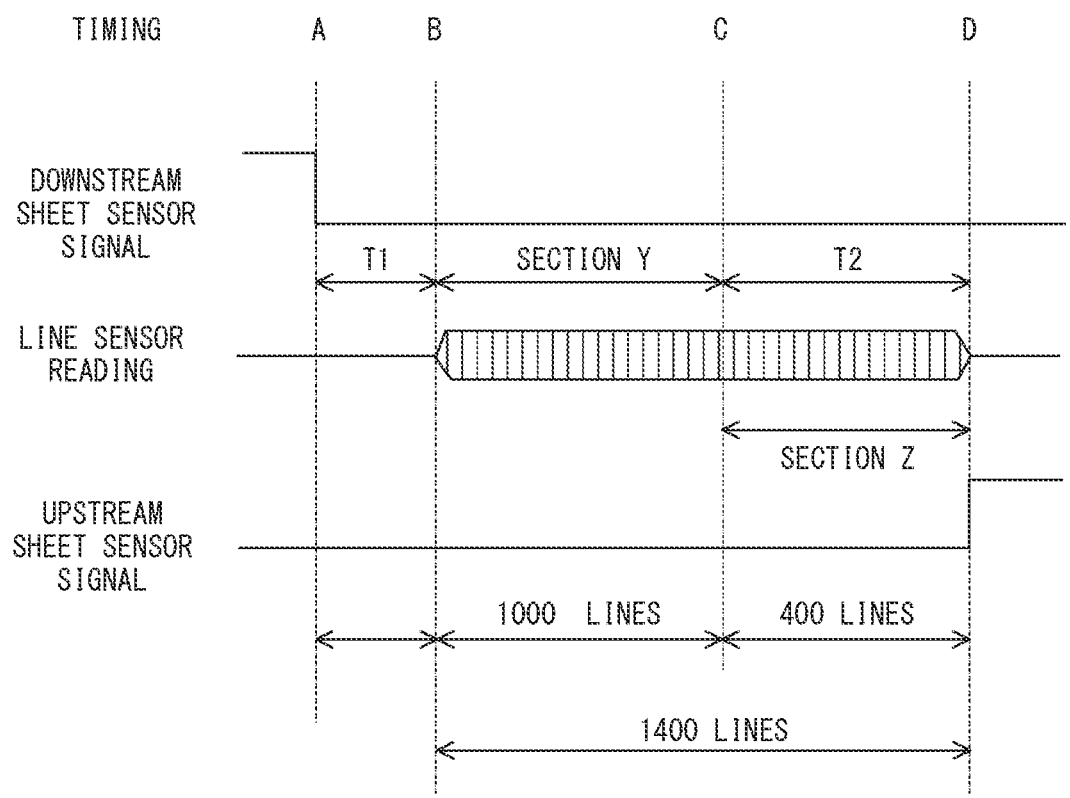
FIG. 20 is a timing chart for a case in which measurement is performed during drawing out.

FIG. 20 is a timing chart for a case in which measurement is performed while the sheet S is being drawn out. The sheet S has already been inserted up to the innermost abutment portion 108, and hence the upstream sheet sensor 104 and the downstream sheet sensor 105 are in a state of having detected the sheet S. When the user draws out the sheet S under this state, the sheet property measurement device 100 causes the optical sensor 1031 to start reading of the sheet S after elapse of a time corresponding to a predetermined section T1 starting from a timing A at which the detection result given by the downstream sheet sensor 105 changes from a first state in which the sheet S has been detected to a second state in which the sheet S is not detected. The optical sensor 1031 reads the surface of the sheet S at a predetermined time interval. After that, when the user finishes drawing out the sheet S, the detection result given by the upstream sheet sensor 104 changes from a third state in which the sheet S has been detected to a fourth state in which the sheet S is not detected. At a timing D of this change, the sheet property measurement device 100 causes the optical sensor 1031 to finish reading of the sheet S.

When a region in which the measurement results are stable is a section Y, a drawing-out speed of the sheet S is not stable in a predetermined section Z immediately before an end of the drawing out of the sheet S. Thus, pieces of data acquired in this section Z are required to be excluded from the determination of the sheet type of the sheet S. The information processing unit 160 calculates the unevenness surface property detection value R based on reading results obtained by excluding the reading results for a predetermined period from the plurality of reading results (difference integrated values E) accumulated in the memory. When the unevenness surface property detection value is calculated, an averaging process is performed on difference integrated values of lines excluding lines corresponding to the section Z (in this case, 400 lines), that is, difference integrated values within the section Y, among the pieces of data stored in the memory, to thereby calculate the unevenness surface property detection value.

As described above, the sheet property measurement device 100 according to this embodiment causes the information processing unit 160 to sort out the measurement results given by the surface property measurement unit 103 that measures the surface properties of the sheet S during the movement thereof (reading results obtained by the optical sensor 1031 a plurality of times) based on the detection results of the sheet S given by the upstream sheet sensor 104 and the downstream sheet sensor 105. For example, the measurement results given by the surface property measurement unit 103 are sorted out based on the detection result given by the upstream sheet sensor 104 or the downstream sheet sensor 105 that changes at a later timing. The measurement results acquired a predetermined time or more before a timing of a change of the detection result that changes at a later timing are selected, and measurement results acquired within the predetermined time before the timing of the change are excluded. The information processing unit 160 calculates the parameter representing the surface properties based on the selected measurement results given by the surface property measurement unit 103. Thus, the measurement results obtained at the timings at which the insertion speed of the sheet S is unstable are removed when the parameter is calculated. Accordingly, the parameter representing the surface properties can be calculated with high accuracy, and the type of the sheet S can be identified with high accuracy. Due to the highly accurate identification of the type of the sheet S, the image forming apparatus 201 can appropriately determine the image forming conditions at the time of image formation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041720, filed Mar. 16, 2022, which is hereby incorporated by reference herein in its entirety.

What is claimed is:

1. A sheet property measurement device comprising:
   a passage configured to allow a sheet to be manually inserted thereinto;
   a reading sensor configured to read a surface of the sheet inserted into the passage;
   a detection unit having a displacement member configured to be brought into contact with the sheet downstream of a reading position of the reading sensor in an insertion direction in which the sheet is inserted and change in displacement amount depending on a thickness of the sheet, the detection unit being configured to detect the displacement amount of the displacement member;
   a sheet sensor configured to detect that the sheet has arrived at a detection position downstream of the displacement member in the insertion direction; and
   a controller configured to:
      control the reading sensor to read the surface of the sheet a plurality of times during a period in which the sheet is being inserted;
      determine a property of the surface of the sheet based on reading results excluding reading results obtained during a predetermined period from among reading results obtained by the reading sensor the plurality of times, the predetermined period being a period that precedes a timing at which the sheet is detected by the sheet sensor; and
      determine a plurality of candidates for a type of the sheet based on the properties of the surface of the sheet and the thickness of the sheet, the thickness of the sheet being determined based on a detection result from the detection unit.

2. The sheet property measurement device according to claim 1,
   wherein the displacement member comprises a lever having an angle relative to the insertion direction, and the angle changes, in a case where the sheet is inserted, by being pushed by the sheet, and
   wherein the detection unit is configured to detect a displacement amount of the angle of the lever.

3. The sheet property measurement device according to claim 1, wherein the controller is configured to control to display the plurality of candidates for the type of the sheet.

4. The sheet property measurement device according to claim 1, further comprising another sheet sensor configured to detect the sheet that has arrived at another detection position upstream of the reading position with respect to the insertion direction,
   wherein the controller is configured to control the reading sensor to start reading of the surface of the sheet after the sheet has been detected by the other sheet sensor.

5. An image forming apparatus for forming an image on a sheet based on image forming conditions, the image forming apparatus comprising:
   a passage configured to allow a sheet to be manually inserted thereinto;
   a reading sensor configured to read a surface of the sheet inserted into the passage;
   a detection unit having a displacement member configured to be brought into contact with the sheet downstream of a reading position of the reading sensor in an insertion direction in which the sheet is inserted and change in displacement amount depending on a thickness of the sheet, the detection unit being configured to detect the displacement amount of the displacement member;
   a sheet sensor configured to detect the sheet that has arrived at a detection position downstream of the displacement member in the insertion direction;
   a display; and
   a controller configured to:
      control the reading sensor to read the surface of the sheet a plurality of times during a period in which the sheet is being inserted;
      control the display to display a plurality of candidates for a type of the sheet based on reading results excluding reading results obtained during a predetermined period from among reading results obtained by the reading sensor the plurality of times, the predetermined period being a period that precedes a timing at which the sheet is detected by the sheet sensor; and
      control the image forming conditions based on information relating to the type of the sheet selected from among the plurality of candidates displayed on the display.

6. The image forming apparatus according to claim 5,
   wherein the displacement member comprises a lever having an angle relative to the insertion direction, and the angle changes, in a case where the sheet is inserted, by being pushed by the sheet, and
   wherein the detection unit is configured to detect a displacement amount of the angle of the lever.

7. The image forming apparatus according to claim 5, further comprising another sheet sensor configured to detect the sheet that has arrived at another detection position upstream of the reading position with respect to the insertion direction,
   wherein the controller is configured to control the reading sensor to start reading of the surface of the sheet after the sheet has been detected by the other sheet sensor.

8. An image forming apparatus for forming an image on a sheet based on image forming conditions, the image forming apparatus comprising:
   a passage configured to allow a sheet to be manually inserted thereinto;
   a reading sensor configured to read a surface of the sheet inserted into the passage;
   a sheet sensor configured to detect the sheet that has arrived at a detection position upstream of a reading position of the reading sensor with respect to an insertion direction in which the sheet is inserted;

a display; and a controller configured to:

control the reading sensor to read the surface of the sheet a plurality of times during a period in which the sheet is being drawn out in a direction opposite to the insertion direction in which the sheet is inserted;

control the display to display a plurality of candidates for a type of the sheet based on reading results excluding reading results obtained during a predetermined period from among reading results obtained by the reading sensor the plurality of times, the predetermined period being a period that precedes a timing at which the sheet is detected by the sheet sensor; and control the image forming conditions based on information relating to the type of the sheet selected from among the plurality of candidates displayed on the display.

9. The image forming apparatus according to claim 8, further comprising another sheet sensor configured to detect the sheet that has arrived at another detection position downstream of the reading position in the insertion direction, wherein the controller is configured to control the reading sensor to start reading of the surface of the sheet after a detection result from the other sheet sensor has been switched from a first state in which the sheet has been detected to a second state in which the sheet is not detected.

10. The image forming apparatus according to claim 8, further comprising a basis weight sensor provided for the passage and configured to detect a basis weight of the sheet, wherein the controller is configured to control the display to display the plurality of candidates for the type of the sheet based on reading results excluding reading results obtained during the predetermined period from among reading results obtained by the reading sensor the plurality of times and the basis weight of the sheet detected by the basis weight sensor.

11. The image forming apparatus according to claim 8, further comprising a thickness sensor provided for the passage and configured to detect a thickness of the sheet, wherein the controller is configured to control the display to display the plurality of candidates for the type of the sheet based on reading results excluding reading results obtained during the predetermined period from among reading results obtained by the reading sensor the plurality of times and the thickness of the sheet detected by the thickness sensor.

12. The image forming apparatus according to claim 8, further comprising:

a basis weight sensor provided for the passage and configured to detect a basis weight of the sheet; and a thickness sensor provided for the passage and configured to detect a thickness of the sheet, wherein the controller is configured to control the display to display the plurality of candidates for the type of the sheet based on reading results excluding reading results obtained during the predetermined period from among reading results obtained by the reading sensor the plurality of times, the basis weight of the sheet detected by the basis weight sensor, and the thickness of the sheet detected by the thickness sensor.

* * * * *